United States Patent [19]

Okuda et al.

[11] Patent Number: 5,638,231
[45] Date of Patent: Jun. 10, 1997

[54] MAGNETIC RECORDING AND REPRODUCING DEVICE HAVING NO MOVEABLE SLANTING POSTS

[75] Inventors: Yasuhiro Okuda; Syosuke Oka; Nobuzumi Kurihara, all of Nagaokakyo, Japan

[73] Assignee: Mitsubishi Denki Kabushiki Kaisha, Tokyo, Japan

[21] Appl. No.: 250,497

[22] Filed: May 27, 1994

[30] Foreign Application Priority Data

| May 31, 1993 | [JP] | Japan | 5-128890 |
| Jul. 15, 1993 | [JP] | Japan | 5-199103 |
| Apr. 20, 1994 | [JP] | Japan | 6-081598 |

[51] Int. Cl.$^6$ ............................................. G11B 5/027
[52] U.S. Cl. ............................................. 360/85
[58] Field of Search ............................... 360/85, 95

[56] References Cited

U.S. PATENT DOCUMENTS

| 5,166,843 | 11/1992 | Kuwajima | 360/85 |
| 5,285,332 | 2/1994 | Konishi et al. | 360/85 |
| 5,315,460 | 5/1994 | Takeda et al. | 360/85 |

FOREIGN PATENT DOCUMENTS

| 103765 | 4/1990 | Japan . |
| 78150 | 4/1991 | Japan . |
| 143956 | 3/1992 | Japan . |

*Primary Examiner*—John H. Wolff
*Assistant Examiner*—George J. Letscher

[57] ABSTRACT

A magnetic recording and reproducing device comprises a tape guide mechanism for taking up the tape within the cassette when unloaded state, and withdrawing the tape from the cassette so as to wind the tape on the rotary head drum when loaded state. The mechanism comprises a first guide slot, a first moving member, and a first guide roller provided on the first moving member. The center line of the tape wound on the first guide roller lies in the reference plane. The mechanism comprises a second guide slot provided on take-up reel side and having a slanting part, a second moving member, and a second guide roller provided on the second moving member. The second guide roller rotates about a second axis having a predetermined tilt angle and a predetermined direction angle so that the center line of the tape is situated lower than the reference plane, is wound from the rotary head drum so that the center line of the tape is oriented toward the reference plane. The mechanism comprises a slanting post fixed to the deck base at a predetermined tilt angle and a predetermined direction angle such that, the tape on the take-up reel side of the second guide roller is wound so that it advances parallel to the x-y plane with the center line lying in the reference plane.

12 Claims, 34 Drawing Sheets

MAGNETIC RECORDING AND REPRODUCING DEVICE HAVING NO MOVEABLE SLANTING POSTS

This invention relates to a magnetic recording and reproducing device which records or reproduces information by winding a magnetic tape spirally on a rotary head drum, as in a video tape recorder (VTR) or a digital audio tape recorder (DAT), and in particular, relates to a tape guide mechanism which forms a tape travel path in such a magnetic recording and reproducing device.

FIG. 41 is a plan view showing, in schematic form, the construction of a tape guide mechanism of a conventional magnetic recording and reproducing device as is for example disclosed in Japanese Patent Kokai Publications H2-103765 (103765/1990) and H4-143956 (143956/1992).

As shown in FIG. 41, in a conventional magnetic recording and reproducing device, when a magnetic tape 303 is loaded in the device, the magnetic tape 303 which is pulled out from a supply reel 302 of a tape cassette 301, passes around a tension roller 304, a guide roller 305, a slanting post 307 fixed to a deck base 306, a guide roller 309 provided on a moving member 308, a guide roller 311 provided on a moving member 310 and a slanting post 312 provided on the moving member 310, and is wound at a predetermined angle on a rotary head drum 313. The magnetic tape 303 wound on the rotary head drum 313 is then wound on a slanting post 315 provided on a moving member 314 and a guide roller 316 provided on the moving member 314, a guide roller 318 provided on a moving member 317, and a slanting post 319 fixed to the deck base 306, passes between a capstan 320 rotated by the driving force of a capstan motor (not shown in FIG. 41) and a pinch roller 321 in contact with the capstan 320, is wound on a guide roller 322, and is then taken up by a take-up reel 323 on the tape cassette 301.

In this figure, the arrows K, L, M, N, P, Q and R indicate paths taken by rollers and moving members when the state of the device changes from an unloaded state to a loaded state.

However, in the above conventional magnetic recording and reproducing device, it is difficult to precisely set the tilt angles and direction angles of the four slanting posts 307, 312, 315 and 319. This increases errors in the tape travel path, causes the magnetic tape 303 to twist on the flanges of the guide rollers 309, 311, 316 and 318 and limits the position of the magnetic tape in the width direction, or decreases the accuracy of linearity of the recorded track (track linearity) as the magnetic tape 303 is not precisely guided into the correct position on the rotary head drum 313. Within the present context, angle is understood to mean the angle made by a slanting post with a z axis, the z axis being the height direction of the device (i.e. the direction of the perpendicular through the plane of the paper in FIG. 41 from the underside to the surface). Likewise, the direction angle is understood to mean the angle made by the tilt direction of the post (i.e. the direction of an image of the post projected on the x-y plane by a light beam traveling in the z direction) and the x axis, the x axis being the width direction of the device (horizontal direction in FIG. 41) and the y axis being the depth direction of the device (i.e. vertical direction in FIG. 41). It is moreover very costly to machine and assemble the four slanting posts 307, 312, 315 and 319 so that their tilt angles and direction angles are very precise, and this makes the device itself more expensive.

Further, if the number of non-rotating, fixed posts in the travel path of the magnetic tape 303 is increased, the total winding angle at the posts increases. The tension acting on the magnetic tape 303 therefore increases proportionately, and particularly in the case of thin magnetic tapes where low tension control is required, this often leads to tape running problems.

Again, when the magnetic tape 303 was advanced rapidly by separating the pinch roller 321 from the capstan 320 and rotating the take-up reel 323 (i.e. the fast forward mode), the capstan 320 comes into contact with the magnetic surface 303a of the magnetic tape 303 so that its magnetism is reduced and recorded information is lost. This loss of magnetism is particularly serious when the capstan 320 is constructed of a very hard magnetic material such as SUS420J2 or the like. On the other hand, when the capstan 320 is constructed of a non-magnetic material such as SUS303 or the like, the capstan bearing suffers serious wear due to insufficient hardness.

SUMMARY OF THE INVENTION

It is therefore an object of this invention to provide a magnetic recording and reproducing device wherein, by reducing the number of slanting posts in the tape travel path, errors in tape travel position are reduced, the device can be manufactured at low cost, and tape travel is steady under a low tape tension.

It is a further object of this invention to provide a magnetic recording and reproducing device wherein, in a mode where the take-up reel is rotated to transport the magnetic tape, loss of tape magnetism is prevented, and capstan wear is suppressed.

According to one aspect of the present invention, a magnetic recording and reproducing device comprises: a deck base extending parallel to an x-y plane including mutually perpendicular x and y axes; a cassette housing for housing a tape cassette such that a center line of a magnetic tape wound on a supply reel or a take-up reel of the tape cassette lies in a reference plane parallel to the x-y plane; a rotary head drum having a center axis aligned at a predetermined tilt angle with respect to a z axis which is perpendicular to the x axis and the y axis and a predetermined direction angle with respect to the x axis, the magnetic tape withdrawn from the tape cassette being spirally wound on the outer circumference of the rotary head drum; and a tape guide mechanism for taking up the magnetic tape within the tape cassette when the device is in an unloaded state, and withdrawing the magnetic tape from the tape cassette so as to wind the magnetic tape on the rotary head drum when the device is in a loaded state. The tape guide mechanism comprises: a first guide slot provided on the supply reel side of the rotary head drum on the deck base; a first moving member for moving along the first guide slot; a first guide roller provided on the first moving member which rotates about a first axis aligned in the direction of the z axis, the first guide roller winding the magnetic tape whereof the center line lies in the reference plane when the device is in a loaded state; a second guide slot provided on the take-up reel side of the rotary head drum on the deck base, the second guide slot comprising a slanting part which slants downwards as the second guide slot approaches the rotary head drum; a second moving member for moving along the second guide slot; a second guide roller provided on the second moving member, the second guide roller rotating about a second axis having a predetermined tilt angle with respect to the z axis and a predetermined direction angle with respect to the x axis when the device is in a loaded state so that the magnetic tape, whereof the center line is situated lower than the reference plane when the device is in a loaded state, is wound from the rotary head drum so that the center line of the magnetic tape is oriented toward the reference plane; and a first slanting post fixed to the deck base at a predetermined tilt angle with respect to the z axis and a predetermined direction angle with respect to the x axis such that, when the device is in a loaded state, the magnetic tape on the take-up reel side of the second guide roller is wound so that it advances parallel to the x-y plane with the center line lying in the reference plane. There is only one slanting post requiring a precise setting of tilt angle and direction angle, so errors in the tape travel path are reduced. Further, as the construction comprises only one slanting post between the supply reel of the tape cassette and the capstan, the tape wound on the rotary head drum may be controlled under a low tension.

According to another aspect of the present invention, a magnetic recording and reproducing device comprises: a deck base; a cassette housing for housing a tape cassette in which a magnetic tape is wound on a supply reel or a take-up reel; take-up disk for rotating the take-up reel of the tape cassette housed in the cassette housing; a rotary head drum on which the magnetic tape withdrawn from the tape cassette housed in the cassette housing, is wound; a first slanting post on the take-up reel side of the rotary head drum, the magnetic tape being wound on the first slanting post; a capstan which rotates so as to cause the magnetic tape to advance; a pinch roller for pushing the magnetic tape against the capstan so as to grip the magnetic tape; a first pushing member for pushing the pinch roller towards the capstan; a second pushing member for pushing the pinch roller so as to separate the pinch roller from the capstan; and a guide roller on the take-up reel side of the capstan, a base surface of the magnetic tape being wound on the guide roller; and a movable tape guide on the take-up reel side of the first slanting post, the movable tape guide moving in conjunction with the pinch roller actuated by the first pushing member or the second pushing member so as to come into contact with the magnetic tape or move away from the magnetic tape. When a first tape transport mode is selected, the magnetic tape is gripped between the capstan and the pinch roller due to the displacement of the pinch roller actuated by the first pushing member, the movable tape guide is moved away from the magnetic tape, and the magnetic tape is advanced due to the rotation of the capstan. On the other hand, when a second tape transport mode is selected, the pinch roller is separated from the capstan by the second pushing member, the magnetic tape is separated from the capstan and the pinch roller, the movable tape guide is brought into contact with the magnetic tape, and the magnetic tape is advanced by the take-up disk. Therefore, in the first tape transport mode, the tape is advanced steadily due to the rotation of the capstan, while in the second tape transport mode, the tape is taken up at high speed by the take-up disk. Further, in the second tape transport mode, the tape does not come into contact with the capstan, so the tape does not lose any of its magnetism.

According to yet another aspect of the present invention, a magnetic recording and reproducing device comprising: a deck base; a cassette housing for housing a tape cassette in which a magnetic tape is wound on a supply reel or a take-up reel; a take-up disk for rotating the take-up reel of the tape cassette housed in the cassette housing; a rotary head drum on which the magnetic tape withdrawn from the tape cassette housed in the cassette housing, is wound; a first slanting post on the take-up reel side of the rotary head drum, the magnetic tape being wound on the first slanting post; a capstan which rotates so as to cause the magnetic tape to advance; a pinch roller for pushing the magnetic tape against the capstan so as to grip the magnetic tape; a first pushing member for pushing the pinch roller towards the capstan; a second pushing member for pushing the pinch roller so as to separate the pinch roller from the capstan; and a guide roller on the take-up reel side of the capstan, a base surface of the magnetic tape being wound on the guide roller; and a fixed tape guide which is separated from the magnetic tape when a first tape transport mode is selected, and is contact with the magnetic tape when a second tape transport mode is selected. When a first tape transport mode is selected, the magnetic tape is gripped between the capstan and the pinch roller due to the displacement of the pinch roller actuated by the first pushing member, and the magnetic tape is advanced due to the rotation of the capstan. On the other hand, when a second tape transport mode is selected, the pinch roller is separated from the capstan by the second pushing member, the magnetic tape is separated from the capstan and the pinch roller, the magnetic tape is brought into contact with the fixed tape guide, and the magnetic tape is advanced by the take-up disk. The tape is therefore either made to advance at a steady speed due to the rotation of the capstan, or is taken up at high speed by the take-up disk, by switching between the first and second tape transport modes. Moreover, in the second tape transport mode, the capstan does not come into contact with the tape, and the tape does not therefore lose any of its magnetism.

DETAILED DESCRIPTION OF THE INVENTION

Some embodiments of this invention will now be described with reference to the attached drawings.

Embodiment 1

Figure 1:
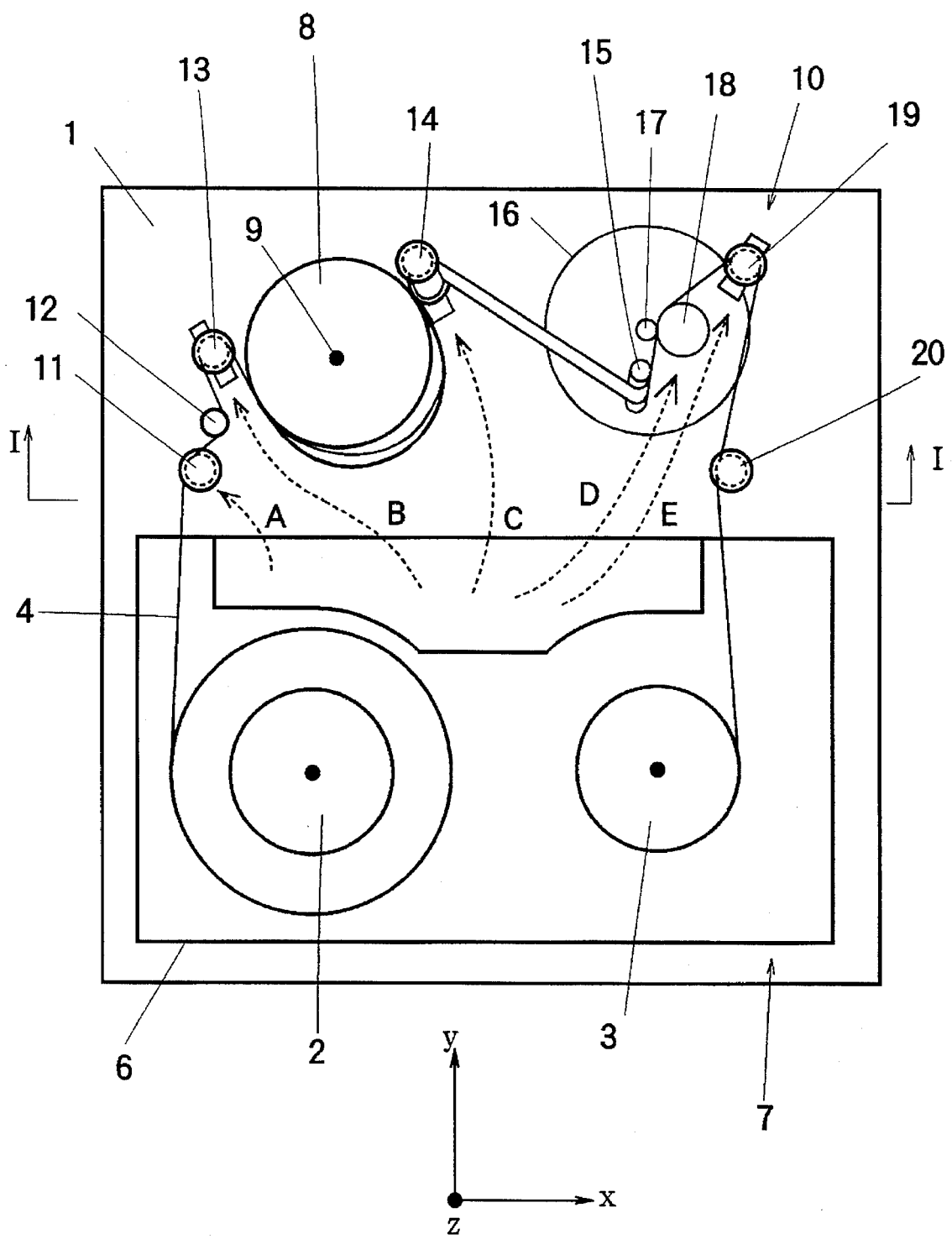
FIG. 1 is a plan view schematically showing a tape guide mechanism of a magnetic recording and reproducing device according to a first embodiment of this invention when a magnetic tape is wound around the rotary head drum (hereinafter abbreviated to the loaded state).
Figure 2:
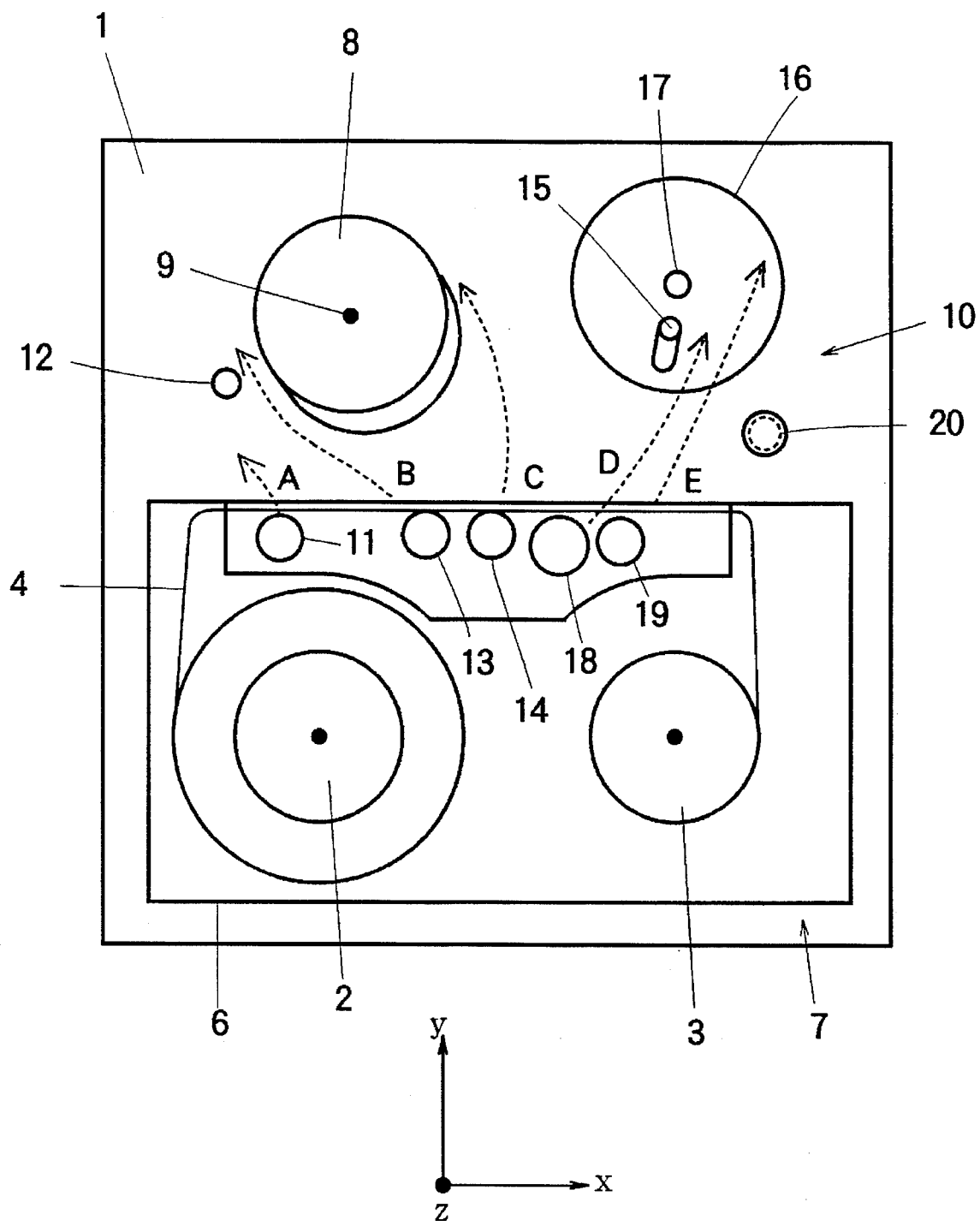
FIG. 2 is a plan view schematically showing the tape guide mechanism of the magnetic recording and reproducing device according to the first embodiment when a magnetic tape is not wound around the rotary head drum (hereinafter abbreviated to the unloaded state).
Figure 3:
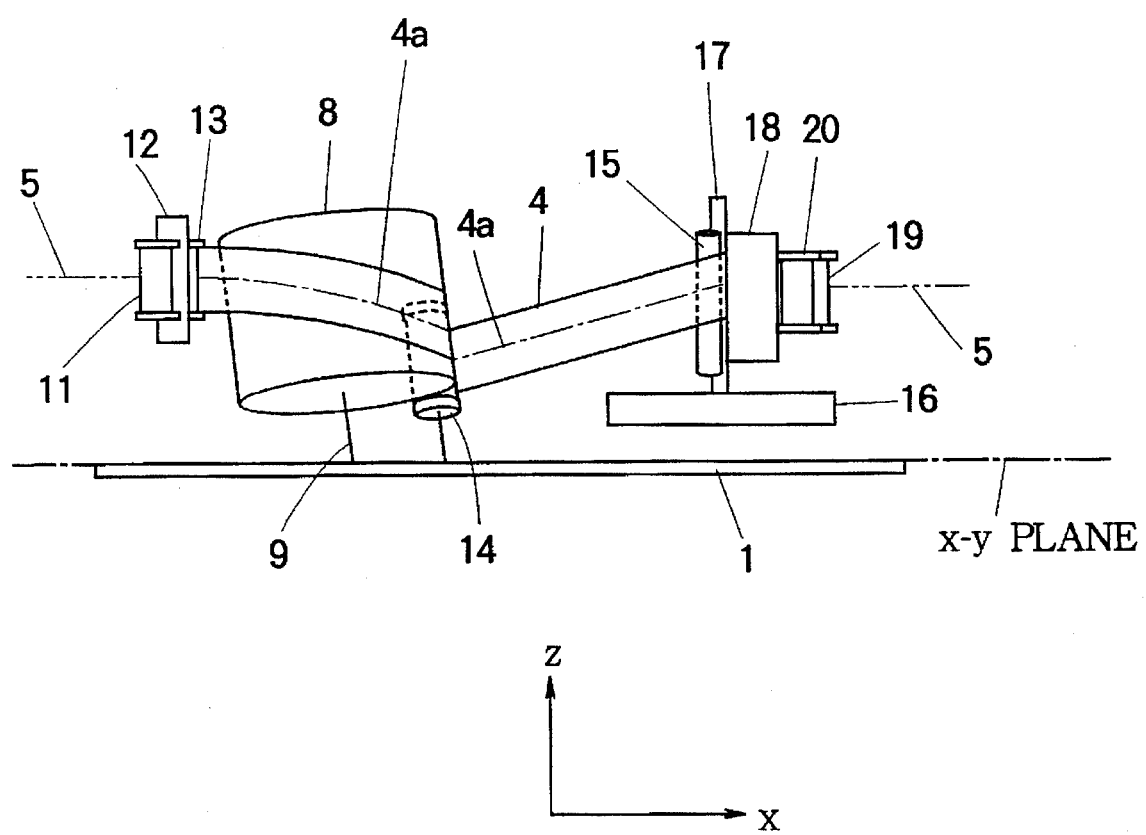
FIG. 3 is a front view schematically showing component parts of the device when viewed from a line I—I in FIG. 1.

FIG. 1 to FIG. 3 show the construction of a magnetic recording and reproducing device according to a first embodiment of this invention. FIG. 1 is a plan view schematically showing a tape guide mechanism when the device is loaded state, i.e. when a magnetic tape is in the wound around a rotary head drum, FIG. 2 is a plan view schematically showing the tape guide mechanism when the device is in the unloaded state, i.e. when the magnetic tape is within a tape cassette, and FIG. 3 is a front view schematically showing the device when viewed from a line I—I in FIG. 1.

As shown in the figures, the magnetic recording and reproducing device according to the first embodiment comprises a deck base 1 extending parallel to an x-y plane containing mutually perpendicular, an x axis and a y axis, and a cassette housing 7 which houses a tape cassette 6 such that a center line 4a (shown by a single dotted line in FIG. 3) of a magnetic tape 4 wound on a supply reel 2 or take-up reel 3, lies in a reference plane 5 (shown by a double dotted line in FIG. 3) parallel to the x-y plane. In the present context, the x axis is taken as the width direction of the device (horizontal direction in FIG. 1), and the y axis is taken as the depth direction of the device (vertical direction in FIG. 1).

The magnetic recording and reproducing device according to the first embodiment also comprises a rotary head drum 8 on the outer circumference of which the magnetic tape 4 drawn out from the cassette 6 is wound in a spiral. This rotary head drum 8 has a center axis 9 aligned at a predetermined tilt angle with respect to the z axis (which axis is perpendicular to the x axis and the y axis). In the present context, tilt angle is understood to mean the angle made by the center axis 9 and the z axis when the height direction of the device (i.e. the direction of the perpendicular running through the plane of the paper in FIG. 1 from the underside to the surface) is taken as the z axis. The center axis 9 also has a predetermined direction angle with respect to the x axis. In the present context, the direction angle of the center axis 9 (i.e. the direction of an image of the center axis 9 projected on the x-y plane by a light beam in the z direction), is understood to mean the angle made with the x axis.

The magnetic recording and reproducing device according to the first embodiment further comprises a tape guide mechanism 10 which takes up the magnetic tape 4 with the cassette 6 when in the unloaded state as shown in FIG. 2, and draws out the magnetic tape 4 from the cassette 6 to wind it on the outer circumference of the rotary head drum 8 when in the loaded state shown in FIGS. 1 to 3.

This tape guide mechanism 10 comprises a guide roller 11 which is guided by a guide slot (not shown) formed in the deck base 1 so that it moves in a direction A, a tension roller 12 which controls the tension in the magnetic tape 4 when in the loaded state, and a guide roller 13 on the supply side which moves in a direction B in a guide slot formed in the deck base 1. The guide roller 11, tension roller 12 and guide roller 13 on supply side are all aligned perpendicular to the x-y plane, i.e. their tilt angles are 0°, the magnetic tape 4 being wound so that its center axis 4a coincides with the reference plane 5. The tension roller 12 comes into contact with the magnetic tape 4 from outside the tape travel path under a predetermined load so that the tension of the magnetic tape 4 is always constant. The tension control mechanism using the tension roller 12 may be a mechanical tension control comprising only mechanical parts such as springs or the like, or it may be an electronic tension control wherein a motor or the like is connected to the supply reel 2 and the back electromotive force of the motor is controlled.

The tape guide mechanism 10 comprises a guide roller 14 on the take-up side which moves in a direction C along a guide slot formed in the deck base 1. This guide roller 14 has a predetermined tilt angle with respect to the z axis and a predetermined direction angle with respect to the x axis when in loaded state. As shown in FIG. 3, by winding the magnetic tape 4 wherein the center line 4a is situated at a lower position than the reference plane 5 (near the deck base 1) from the rotary head drum 8, the travel direction of the magnetic tape 4 is changed so that the center line 4a of the magnetic tape 4 is oriented toward the reference plane 5.

The tape guide mechanism 10 also comprises a slanting post 15 fixed to the deck base 1. This slanting post 15 has a predetermined tilt angle with respect to the z axis, and a predetermined direction angle with respect to the x axis. As shown in FIGS. 1 to 3, when in the loaded state, the magnetic tape 4 on the side of the take-up reel 3 with respect to the roller 14, is wound so that the travel direction of the magnetic tape 4 is parallel to the x-y plane with the center line 4a of the magnetic tape 4 lying in the reference plane 5, and the magnetized surface and base surface of the magnetic tape 4 are perpendicular to the reference plane 5.

The tape guide mechanism 10 further comprises a capstan 17 which is rotated by the driving force of a capstan motor 16 so as to advance the magnetic tape 4 in contact with it, a pinch roller 18 which moves in a direction D and brings the magnetic tape 4 into contact with the capstan 17, a guide roller 19 which moves in a direction E along a guide slot formed in the deck base 1, and a guide roller 20 provided in the deck base 1. The capstan 17, pinch roller 18, guide roller 19 and guide roller 20 are all perpendicular to the x-y plane, i.e. their tilt angles are 0°.

Table 1 below shows typical values of diameters, tilt angles with respect to the z axis, direction angles with respect to the x axis and winding angles of the supply reel 2 and take-up reel 3 of the tape cassette 6, the rotary head drum 8, and the guide rollers and posts constituting the tape guide mechanism 10 in the magnetic recording and reproducing device according to the first embodiment.

TABLE 1

| NUMERAL | COMPOSITION | DIAMETER [mm] | TILT ANGLE [°] | DIRECTION ANGLE [°] | WINDING ANGLE [°] |
| --- | --- | --- | --- | --- | --- |
| 2 | SUPPLY REEL | 17.0 | 0.0 | — | — |
| 11 | GUIDE ROLLER | 3.0 | 0.0 | — | 43.0 |
| 12 | TENSION ROLLER | 3.0 | 0.0 | — | 71.3 |
| 13 | GUIDE ROLLER | 3.5 | 0.0 | — | 184.0 |
| 8 | ROTARY HEAD DRUM | 20.0 | 10.0 | 110.0 | 185.0 |
| 14 | GUIDE ROLLER | 3.5 | 20.0 | 112.5 | 150.0 |
| 15 | SLANTING POST | 2.0 | 11.8 | 80.0 | 116.0 |
| 17 | CAPSTAN | 2.0 | 0.0 | — | 15.0 |
| 18 | PINCH ROLLER | 5.1 | 0.0 | — | 60.0 |
| 19 | GUIDE ROLLER | 3.5 | 0.0 | — | 137.9 |
| 20 | GUIDE ROLLER | 3.0 | 0.0 | — | 14.1 |
| 3 | TAKE-UP REEL | 17.0 | 0.0 | — | — |

Next, the construction of the tape guide mechanism 10 of the magnetic recording and reproducing device according to the first embodiment will be described in further detail.

Figure 4:
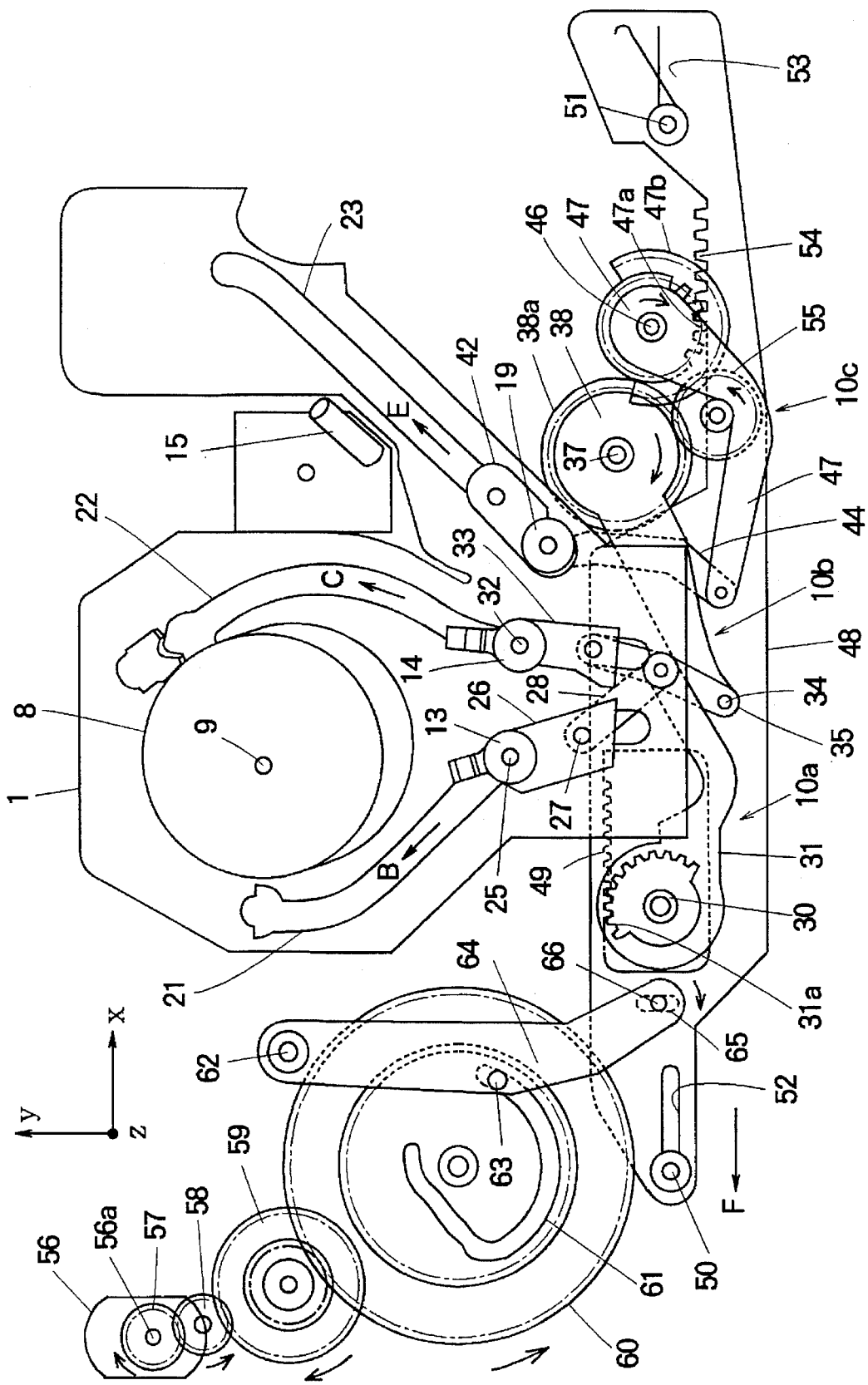
FIG. 4 is a plan view schematically showing the tape guide mechanism of the magnetic recording and reproducing device according to the first embodiment when in the unloaded state.
Figure 5:
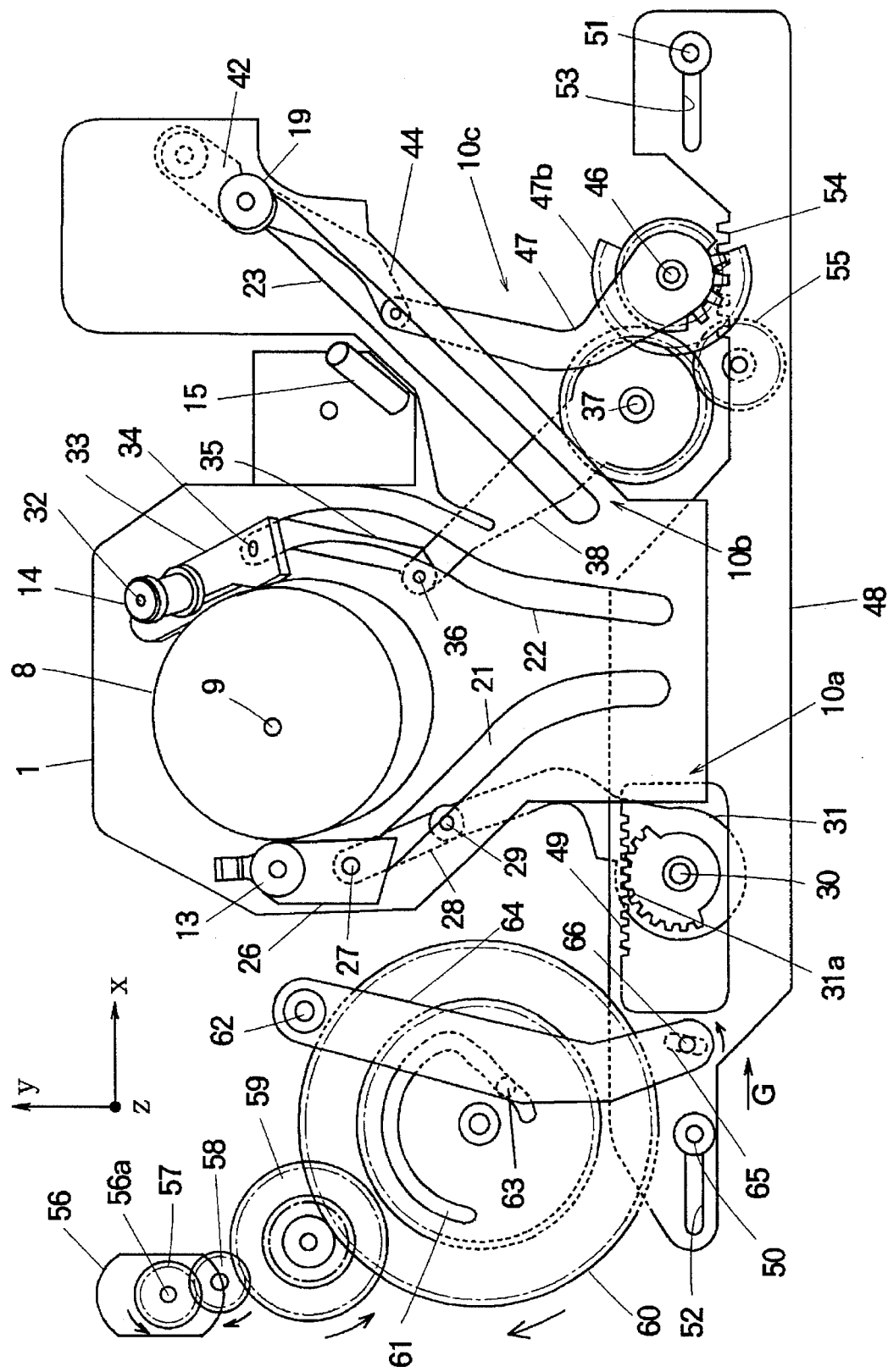
FIG. 5 is a plan view schematically showing the tape guide mechanism of the magnetic recording and reproducing device according to the first embodiment when in the loaded state.
Figure 6:
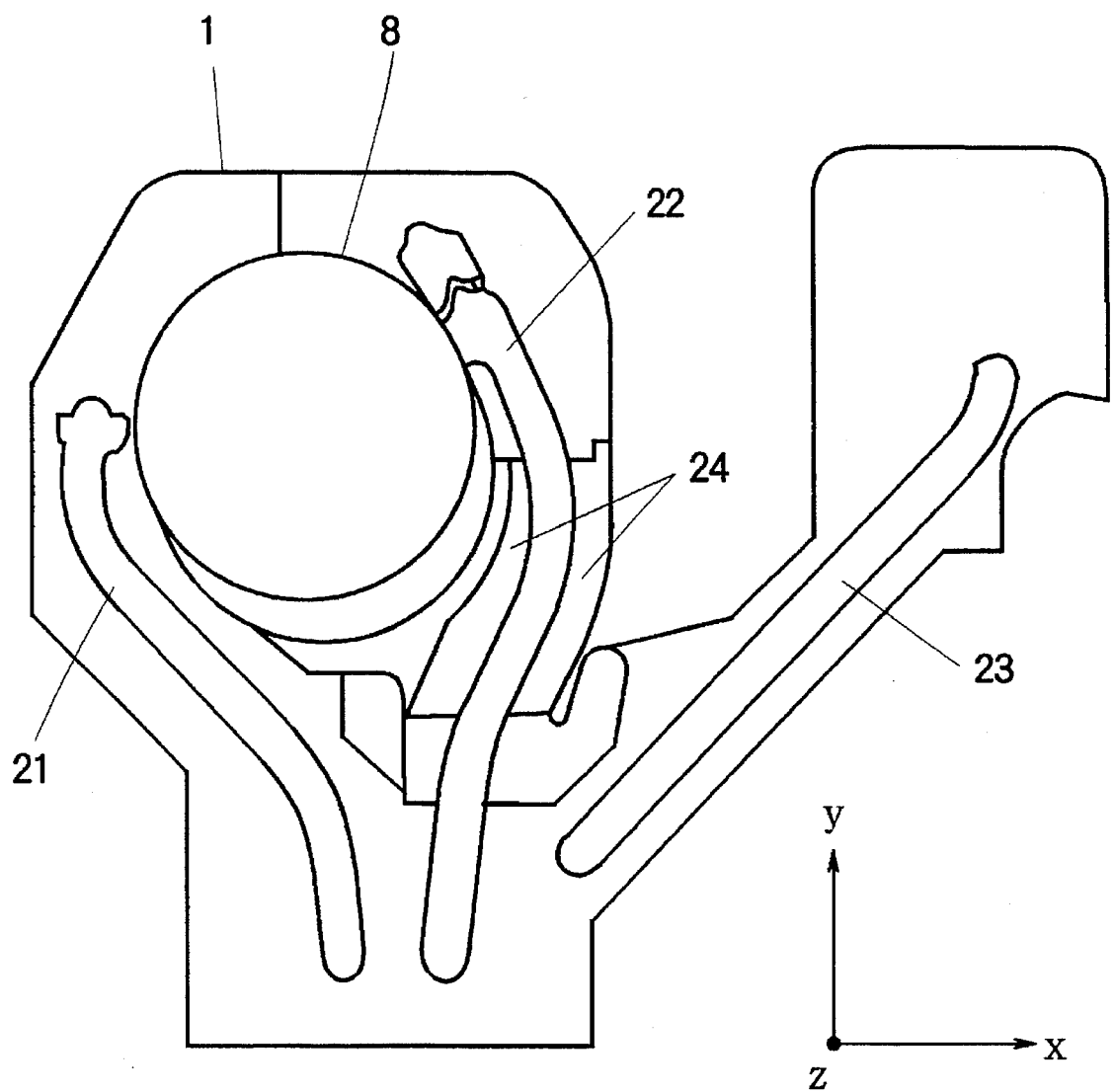
FIG. 6 is a plan view showing guide slots formed in a deck base of the magnetic recording and reproducing device according to the first embodiment.
Figure 7A:
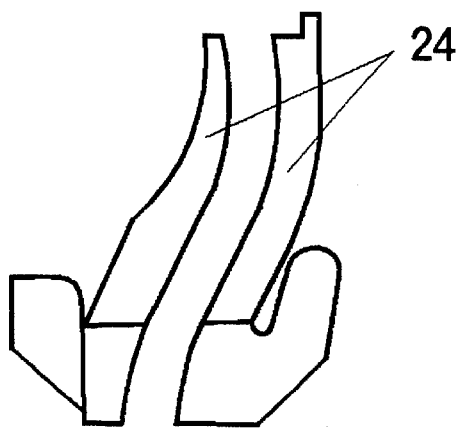
FIG. 7A is a plan view of guide members forming a guide slot on the take-up reel side of the magnetic recording and reproducing device according to the first embodiment.
Figure 7A:
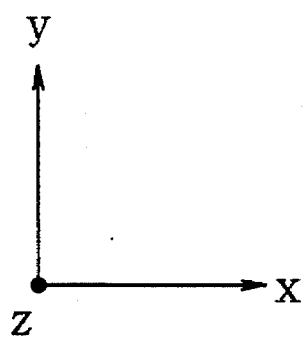
Figure 7B:
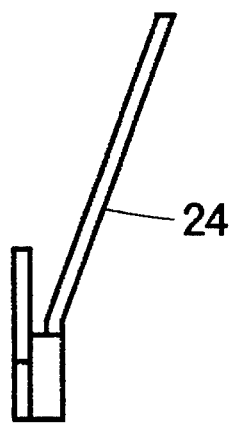
FIG. 7B is a lateral view of the guide members.
Figure 7B:
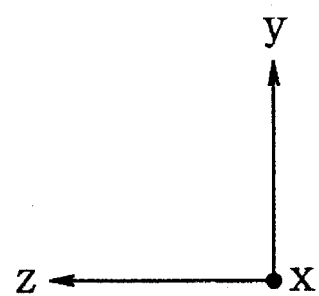
Figure 8:
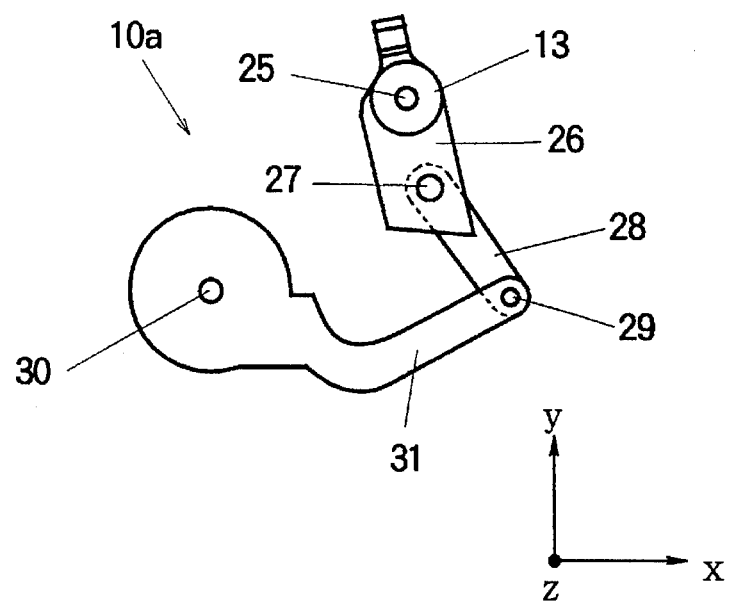
FIG. 8 is a plan view showing a displacement mechanism of a guide roller on the supply side of the magnetic recording and reproducing device according to the first embodiment (when in the unloaded state).
Figure 9:
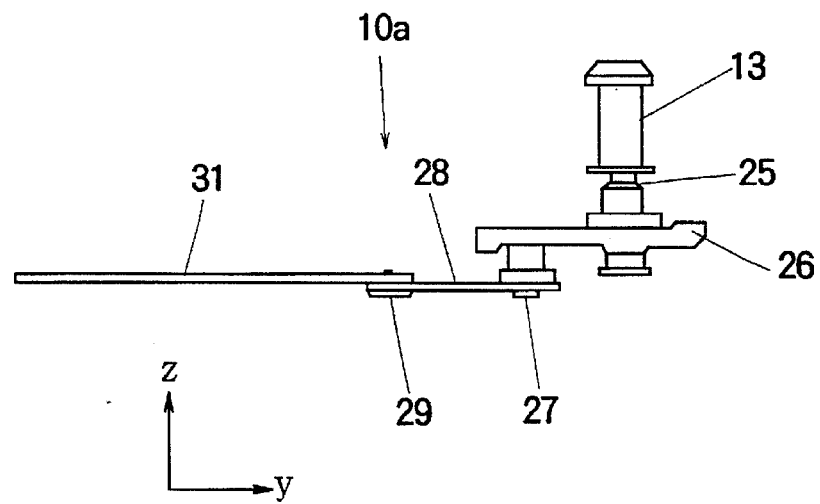
FIG. 9 is a lateral view showing the displacement mechanism of the guide roller on the supply side of the magnetic recording and reproducing device according to the first embodiment (when in the loaded state).
Figure 10:
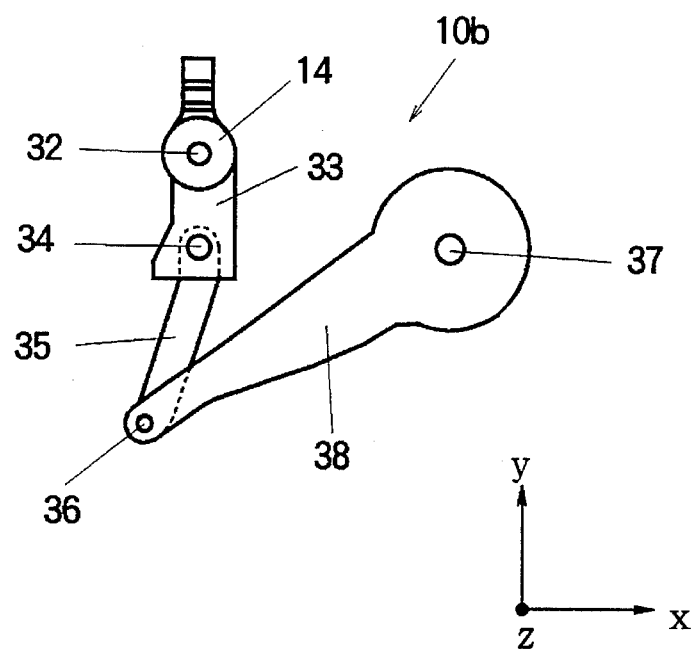
FIG. 10 is a plan view showing a displacement mechanism of a guide roller on the take-up side of the magnetic recording and reproducing device according to the first embodiment (when in the unloaded state).
Figure 11:
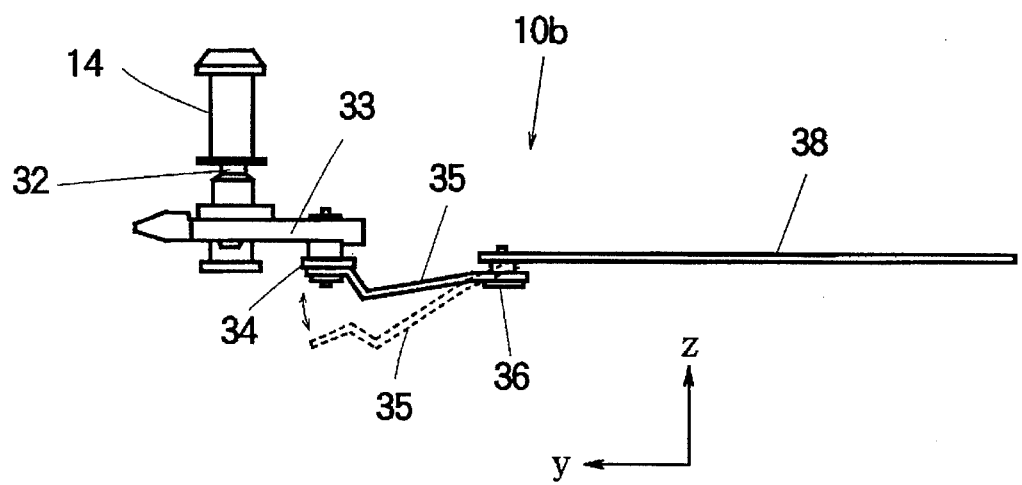
FIG. 11 is a lateral view showing the displacement mechanism of the guide roller on the take-up side of the magnetic recording and reproducing device according to the first embodiment.
Figure 12:
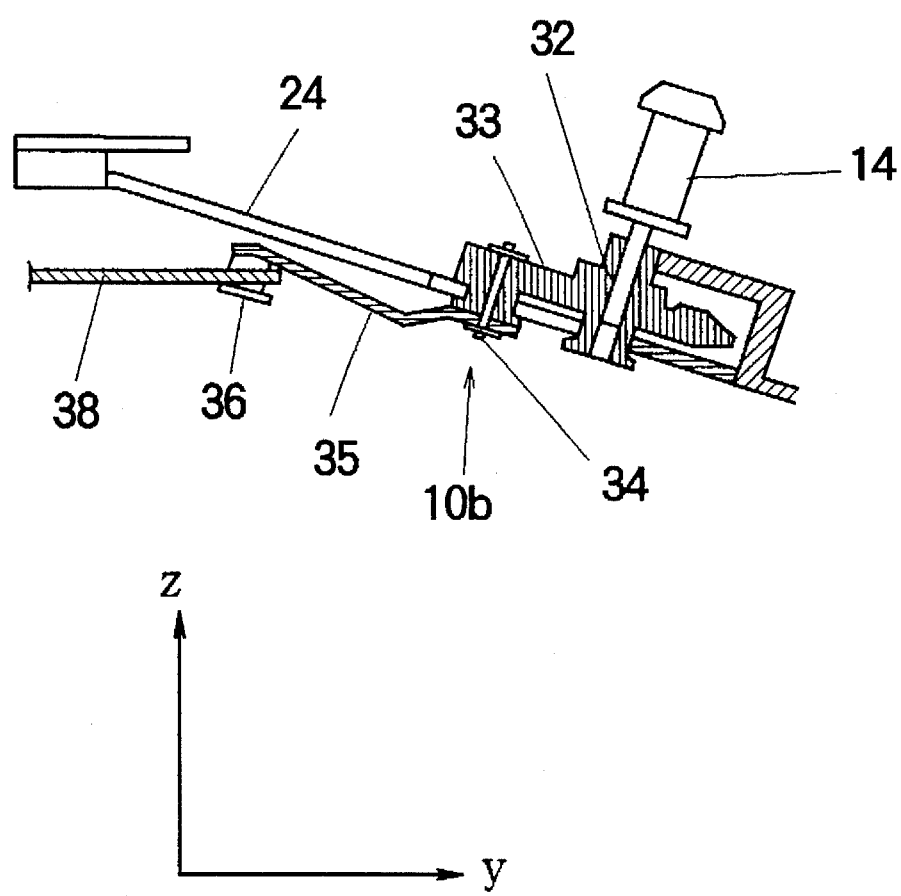
FIG. 12 is a view in section showing the displacement mechanism of the guide roller on the take-up side of the device according to the first embodiment (when in the loaded state).
Figure 13:
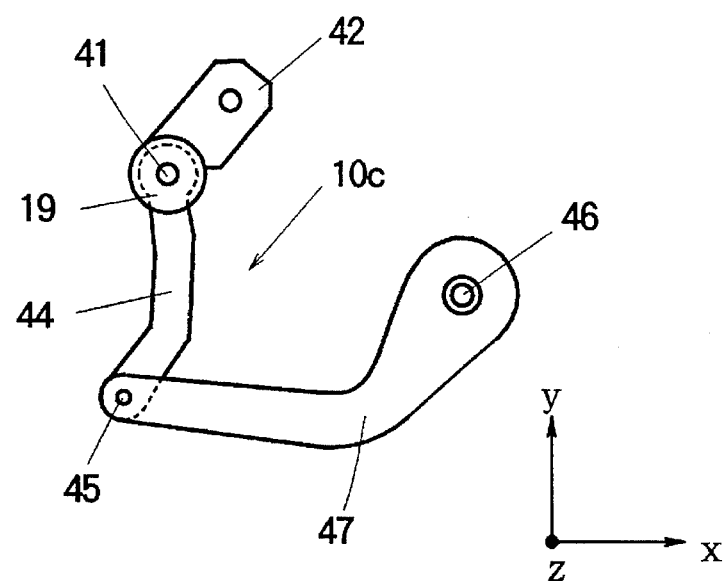
FIG. 13 is a plan view of a displacement mechanism for displacing guide rollers in the device according to the first embodiment (when in the unloaded state).
Figure 14:
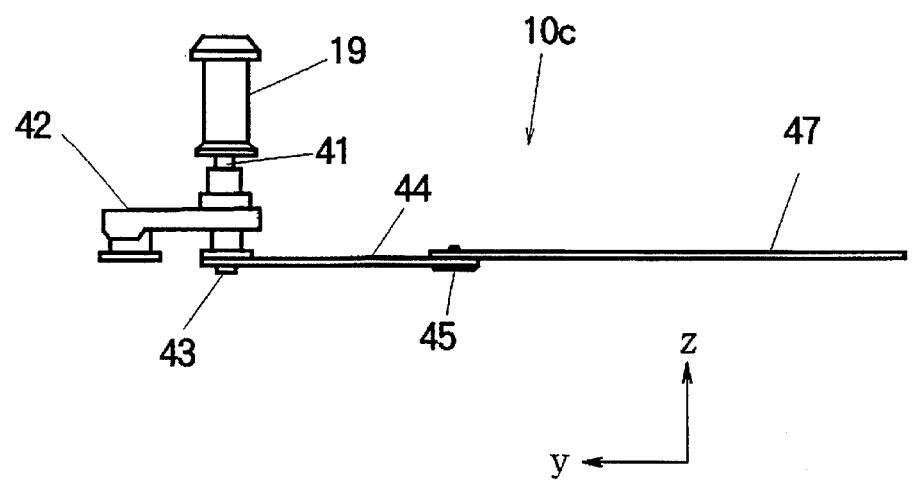
FIG. 14 is a lateral view of the displacement mechanism for displacing guide rollers in the device according to the first embodiment (when in the loaded state).

FIG. 4 and FIG. 5 are plan views showing the detailed construction of the tape guide mechanism 10. FIG. 4 shows the guide mechanism 10 when in the unloaded state, and FIG. 5 shows the guide mechanism when in the loaded state. FIG. 6 is a plan view showing guide slots formed in the deck base 1, FIGS. 7A and 7B are plan and lateral views of guide members forming a guide slot on the take-up reel side. FIG. 8 and FIG. 9 are a plan view when in the unloaded state and a lateral view when in the loaded state showing the displacement mechanism of the guide roller 13 on the supply side. FIG. 10 and FIG. 11 are a plan view when in the unloaded state and a lateral view showing the displacement mechanism of the guide roller 14 on the take-up side, and FIG. 12 is a view in section showing the displacement mechanism of the guide roller 14 on the take-up side when in the loaded state. FIG. 13 and FIG. 14 are a plan view when in the unloaded state and a lateral view when in the loaded state of the displacement mechanism of the guide roller 19.

As shown in FIG. 4 to FIG. 14, in addition to the elements shown in FIG. 1 to FIG. 3, the tape guide mechanism 10 comprises a guide slot in another member either formed in the deck base 1 or fixed to it, a lever mechanism which displaces the guide roller along this guide slot, a slide plate which actuates this lever mechanism, and a drive mechanism which drives this slide plate.

The guide slots, which form part of the construction of the tape guide mechanism 10, as shown in FIG. 4 to FIG. 6, comprise a guide slot 21 formed parallel to the x-y plane on the supply reel side of the rotary head drum 8, a guide slot 22 sloping down and formed on the take-up reel side of the rotary head drum 8, and a guide slot 23 formed parallel to the x-y plane. Members 24 forming the guide slot 22 have the flat shape shown in FIG. 7A, and they have a sloping part which slopes down as it approaches the rotary head drum 8 (i.e. in the direction of the y axis), as shown in FIG. 7B.

The lever mechanisms which form part of the tape guide mechanism 10 comprise a lever mechanism 10a which displaces the guide roller 13 on the tape supply side, a lever mechanism 10b which displaces the guide roller 14 on the tape take-up side, and a lever mechanism 10c which displaces the guide roller 19.

The lever mechanism 10a for the guide roller 13 on the tape supply side, as shown in FIG. 4, FIG. 5, FIG. 8 and FIG. 9, comprises a moving member 26 which supports the guide roller 13 on the take-up side such that the guide roller 13 is free to turn about a shaft 25, this moving member 26 being capable of movement along the guide slot 21, a lever 28 connected to the moving member 26 via a shaft 27 about which the lever 28 is free to pivot, and a lever 31 connected to the lever 28 via a shaft 29 about which the lever 31 is free to pivot, the lever 31 being supported such that it is free to pivot also about a shaft 30 provided in the deck base 1.

The lever mechanism 10b for the guide roller 14 on the tape take-up side, as shown in FIG. 4, FIG. 5, and FIG. 10 to FIG. 12, comprises a moving member 33 which supports the guide roller 14 such that the guide roller 14 is free to turn about a shaft 32, the moving member 33 being capable of movement along the guide slot 22, a lever 35 connected to the moving member 33 via a shaft 34 about which the lever 35 is free to pivot, and a lever 38 connected to the lever 35 via a shaft 36 about which the lever 38 is free to pivot, the lever 38 being supported such that it is free to pivot also about a shaft 37 provided in the deck base 1. Further, as shown by the broken line in FIG. 11, the lever 35 is connected via the shaft 36 such that it can pivot also in the height direction. Therefore, when the moving member 33 moves in the sloping part of the guide slot 22, the moving member 33 and the lever 35 also move in a sloping direction.

The lever mechanism 10c for the guide roller 19, as shown in FIG. 4, FIG. 5, FIG. 13 and FIG. 14, comprises a moving member 42 which supports the guide roller 19 such that the guide roller 19 is free to turn about a shaft 41, the moving member 42 being capable of movement along the guide slot 23, a lever 44 connected to the moving member 42 via a shaft 43 about which the lever 44 is free to pivot, and a lever 47 connected to the lever 44 via a shaft 45 about which the lever 47 is free to pivot, the lever 47 being supported such that it is free to pivot also about a shaft 46 provided in the deck base 1.

The slide plate 48 comprises a rack part 49 as shown in FIG. 4 which engages with a gear 31a provided on the lever 31. When the slide plate 48 moves in a direction F so that pins 50 and 51 fixed to the deck base 1 move along oblong slots 52 and 53 in the slide plate 48, the lever 31 pivots in a counterclockwise direction, and the moving member 26 which is connected via the lever 28 moves in a direction B along the guide slot 21.

The slide plate 48 also comprises a rack part 54 as shown in FIG. 4 which engages with a gear 47a provided on the lever 47. When the slide plate 48 moves in the direction F so that the pins 50 and 51 fixed to the deck base 1 move along the slots 52 and 53 in the slide plate 48, the lever 47 pivots in a clockwise direction, and the moving member 42 which is connected via the lever 44 moves in a direction E along the guide slot 23.

The lever 47 is also provided with a gear 47b. The deck base 1 has a gear 55 which engages with this gear 47b such that the gear 55 is free to turn, and the lever 38 is provided with a gear 38a which engages with the gear 55. As shown in FIG. 4, therefore, when the slide plate 48 is moved in the direction F so that the pins 50 and 51 fixed to the deck base 1 move along the slots 52 and 53, and the lever 47 pivots in a clockwise direction, the gear 55 turns in a counterclockwise direction, the lever 38 turns in a clockwise direction, and the moving member 33 which is connected via the lever 35 moves in a direction C along the guide slot 22.

The drive mechanism which displaces the slide plate 48 in the F or G directions, as shown in FIG. 4 and FIG. 5, comprises a loading motor 56 provided with a gear 57 on a shaft 56a, a gear 58 which engages with the gear 57, a gear 59 which engages with the gear 58, a cam gear which engages with the gear 59, a pin 63 engaging with a cam slot 61 formed in the cam gear 60, and a lever 64 which pivots about a shaft 62 formed in the deck base 1. As shown in FIG. 4, when the loading motor 56 rotates the shaft 56a in a clockwise direction, the gear 58 turns in a counterclockwise direction, the gear 59 turns in a clockwise direction, the gear 60 turns in a counterclockwise direction, the lever 64 pivots in a counterclockwise direction due to the engaging of the cam slot 61 with the pin 63, and the slide plate 48 moves in the direction F due to the engaging of a cam slot 65 in the slide plate 48 with a pin 66 of the lever 64. On the other hand as shown in FIG. 5, when the loading motor 56 rotates in a counterclockwise direction, the gear 58 turns in a clockwise direction, the gear 59 turns in a counterclockwise direction, the gear 60 turns in a clockwise direction, the lever 64 pivots in a clockwise direction due to the engaging of the cam slot 61 with the pin 63, and the slide plate moves in the direction G due to the engaging of the cam slot 65 in the slide plate 48 with the pin 66 of the lever 64.

In the magnetic recording and reproducing device according to the first embodiment having the above construction, when the magnetic tape 4 is advanced in the tape travel path shown in FIG. 1 due to the rotation of the capstan 17 driven by the rotational driving force of the capstan motor 16, the magnetic tape 4 is supplied by the supply reel 2 at a constant speed, travels on the outer circumference of the rotary head drum 8, and is wound on the take-up reel 3.

The center line 4a of the magnetic tape 4 lies in the reference plane 5 until the magnetic tape, which is supplied by the supply reel 2, reaches the tape arrival side of the rotary head drum 8, so the magnetic tape 4 does not become twisted in its travel path. Moreover, as the magnetic tape 4 is guided only by rotating guide rollers until it reaches the tape arrival side of the rotary head drum 8, the tension acting on the magnetic tape 4 can be reduced. The difference in the value of the tension between the rotary head drum 8 and the tension roller 12 where tension control is particularly important can also be reduced, so that high precision tension control can be performed. The device according to the first embodiment is therefore suitable for the tension control of thin magnetic tape for which a low tension is required, and it permits steady running of thin magnetic tape.

According to the device of the first embodiment, the height of the magnetic tape 4 gradually approaches that of the reference plane 5 as it travels from the guide roller 14 on the tape take-up side toward the slanting post 15, and is wound around the slanting post 15 close to the reference plane 5. The center line 4a of the magnetic tape 4 is positioned in the reference plane 5 by this single slanting post 15, and the travel direction of the magnetic tape 4 is changed so that it is parallel to the reference plane 5. In general, it is difficult to manufacture slanting posts on the deck base with a precise tilt angle and a precise direction angle, so the precise setting of the tape travel position becomes more difficult the greater the number of these slanting posts. According to the device of the first embodiment, however, only one slanting post is used, hence the tape travel position can be set precisely.

According to the device of the first embodiment, the moving members 26 and 33 which move along the guide slots 21 and 22 are not provided with slanting posts. Therefore, as a slanting post is fixed only to the deck base 1, the tilt angle and direction angle of the post do not vary due to dimensional distortions caused by the repeated action of the moving members 26 and 33, and the tape travel path does not shift away from its true path with increasing numbers of years of use of the device.

In the above description, the capstan 17 and the pinch roller 18 are provided between the slanting post 15 and the guide roller 19, but the capstan 17 and the pinch roller 18 may be provided between the guide roller 14 on the take-up side and the slanting post 15, in the same way as the capstan 74 and the pinch roller 75 shown in FIG. 19 which will be described below.

Embodiment 2

Figure 15:
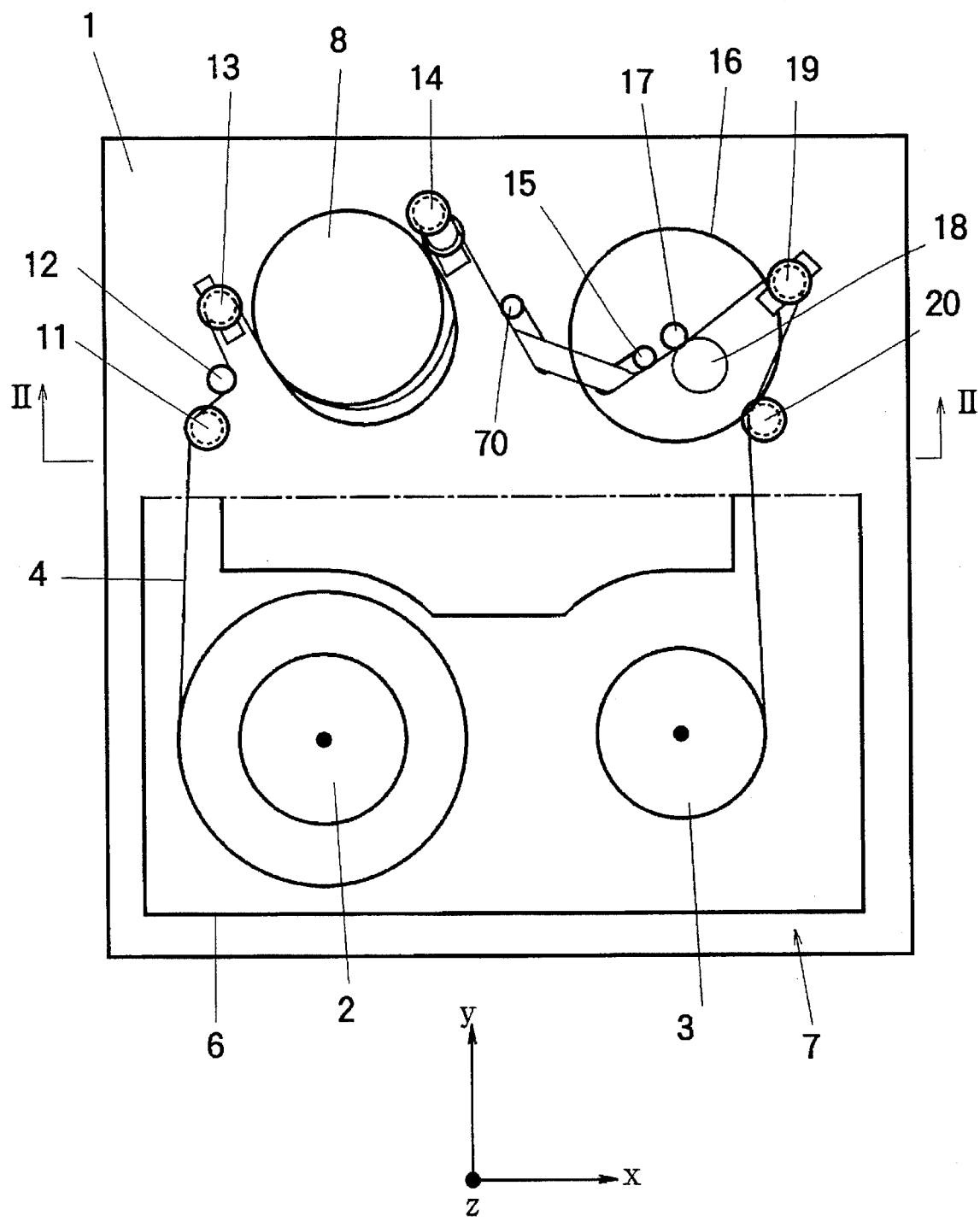
FIG. 15 is a plan view schematically showing the construction of a magnetic recording and reproducing device according to a second embodiment of this invention.
Figure 16:
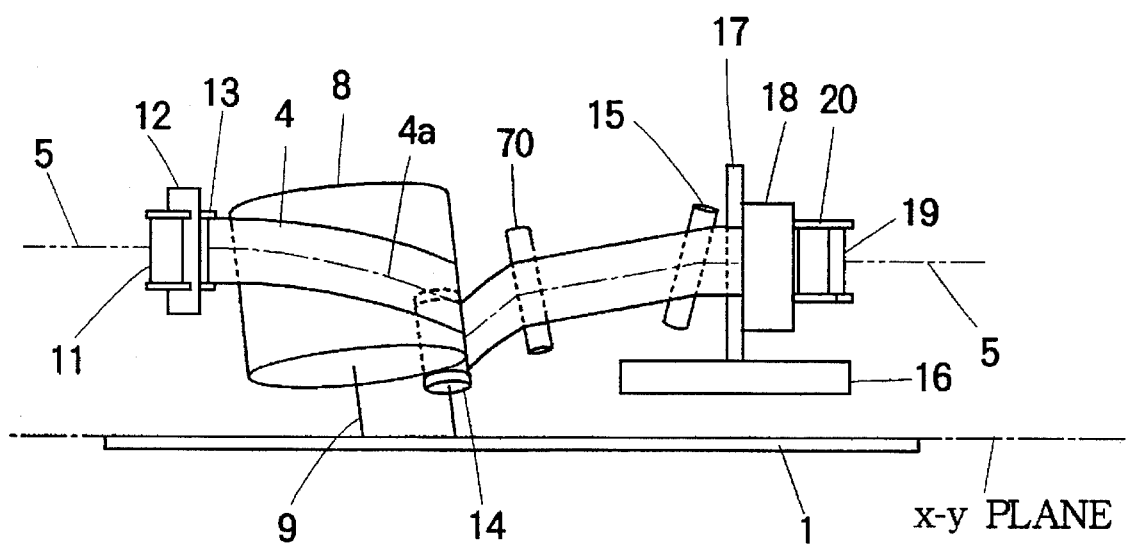
FIG. 16 is a front view schematically showing the device when viewed from a line II—II in FIG. 15.

FIG. 15 is a plan view schematically showing the construction of a magnetic recording and reproducing device according to a second embodiment of this invention, and FIG. 16 is a front view schematically showing the device when viewed from a line II—II in FIG. 15.

The magnetic recording and reproducing device according to the second embodiment differs from that of the first embodiment only in that a slanting post 70 fixed to the deck base 1 is provided between the guide roller 14 on the tape take-up side and the slanting post 15. The same reference numbers have therefore been used to indicate parts in the construction of the device which are identical to those of the first embodiment shown in FIG. 1 to FIG. 14, and a description of these parts is omitted.

Table 2 below shows typical of values of diameters, tilt angles with respect to the z axis, direction angles with respect to the x axis and winding angles of the supply reel 2 and take-up reel 3 of the tape cassette 6, rotary head drum 8, and the guide rollers and posts constituting the tape guide mechanism 10 in the magnetic recording and reproducing device according to the second embodiment.

TABLE 3

| NUMERAL | COMPOSITION | DIAMETER [mm] | TILT ANGLE [°] | DIRECTION ANGLE [°] | WINDING ANGLE [°] |
|---|---|---|---|---|---|
| 2 | SUPPLY REEL | 17.0 | 0.0 | — | — |
| 11 | GUIDE ROLLER | 3.0 | 0.0 | — | 43.0 |
| 12 | TENSION ROLLER | 3.0 | 0.0 | — | 71.3 |
| 13 | GUIDE ROLLER | 3.5 | 0.0 | — | 184.0 |
| 8 | ROTARY HEAD DRUM | 20.0 | 10.0 | 110.0 | 185.0 |
| 14 | GUIDE ROLLER | 3.5 | 20.0 | 112.5 | 177.0 |
| 70 | SLANTING POST | 2.0 | 33.0 | 114.8 | 38.0 |
| 15 | SLANTING POST | 2.0 | 23.5 | 33.9 | 64.5 |
| 17 | CAPSTAN | 2.0 | 0.0 | — | 15.0 |
| 18 | PINCH ROLLER | 5.1 | 0.0 | — | 15.0 |
| 19 | GUIDE ROLLER | 3.5 | 0.0 | — | 151.1 |
| 20 | GUIDE ROLLER | 3.0 | 0.0 | — | 28.3 |
| 3 | TAKE-UP REEL | 17.0 | 0.0 | — | — |

In the device according to the second embodiment, as in the case of the first embodiment, high precision tension control can be performed.

Figure 41:
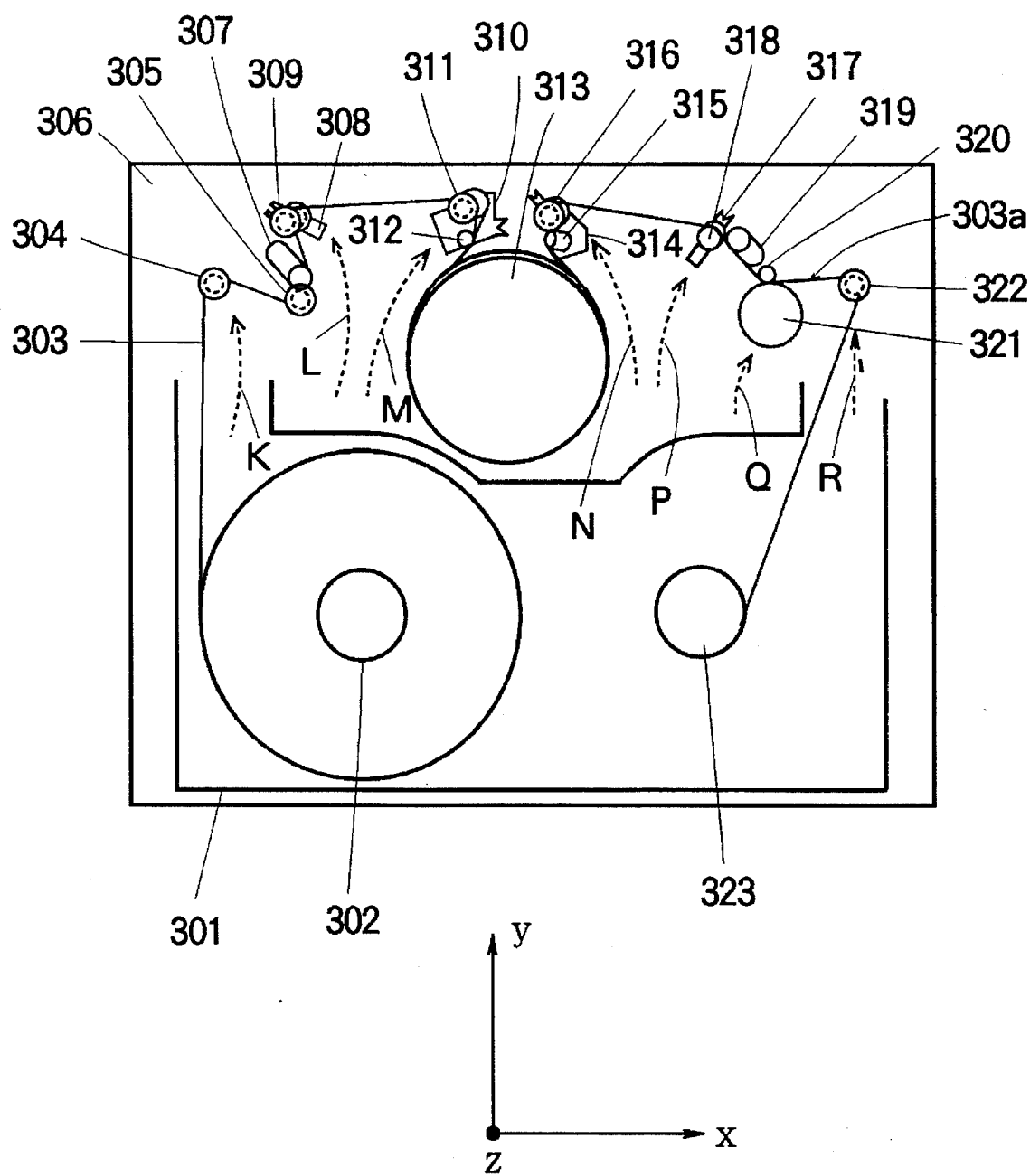
FIG. 41 is a plan view schematically showing the construction of a tape guide mechanism of a conventional magnetic recording and reproducing device.

According to the device of the second embodiment, the center line 4a of the magnetic tape 4 is made to coincide with the reference plane 5, and the tape travel path is changed so that it is parallel to the reference plane 5, by means of the slanting posts 70 and 15. The tape travel position can therefore be set more precisely than in the case of the conventional device shown in FIG. 41.

Moreover, according to the magnetic recording and reproducing device of the second embodiment, the moving members 26 and 33 which move in the guide slots 21 and 22 are not provided with slanting posts, slanting posts being fixed only to the deck base 1. The tilt angle and the direction angle of the slanting posts therefore do not vary due to dimensional distortions caused by repeated actions of the moving members 26 and 33, and the tape travel path does not gradually shift away from its true path with increasing number of years of use of the device.

Moreover, as two slanting posts are provided, the winding angle at each post is reduced, and sharp changes of tape travel direction are avoided.

In addition to the slanting post 15, a slanting post 70 is provided between the guide roller 14 and the slanting post 15. This makes it possible to reduce the winding angle at each post, to set a travel path wherein the travel direction does not vary sharply at the slanting posts 15 and 70, and to enhance steadiness of tape running. As there are only two posts requiring a precise setting of tilt angle and direction angle, errors in the tape travel direction are reduced. Further, as the construction comprises only two slanting posts between the supply reel of the tape cassette and the capstan, the magnetic tape wound on the rotary head drum may be controlled by a low tension, and in particular, the running of thin tape is steadied.

Embodiment 3

Figure 17:
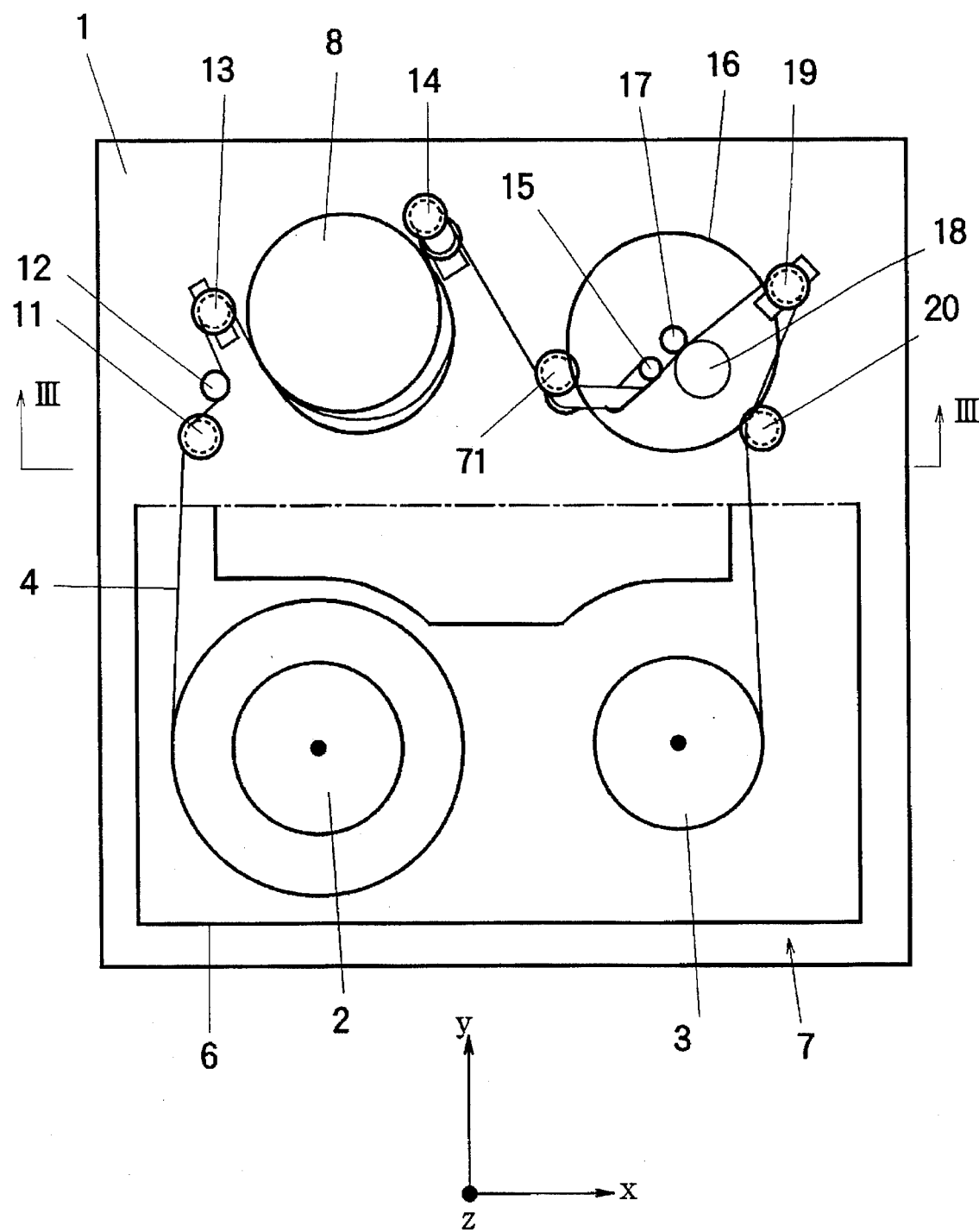
FIG. 17 is a plan view schematically showing the construction of a magnetic recording and reproducing device according to a third embodiment of this invention.
Figure 18:
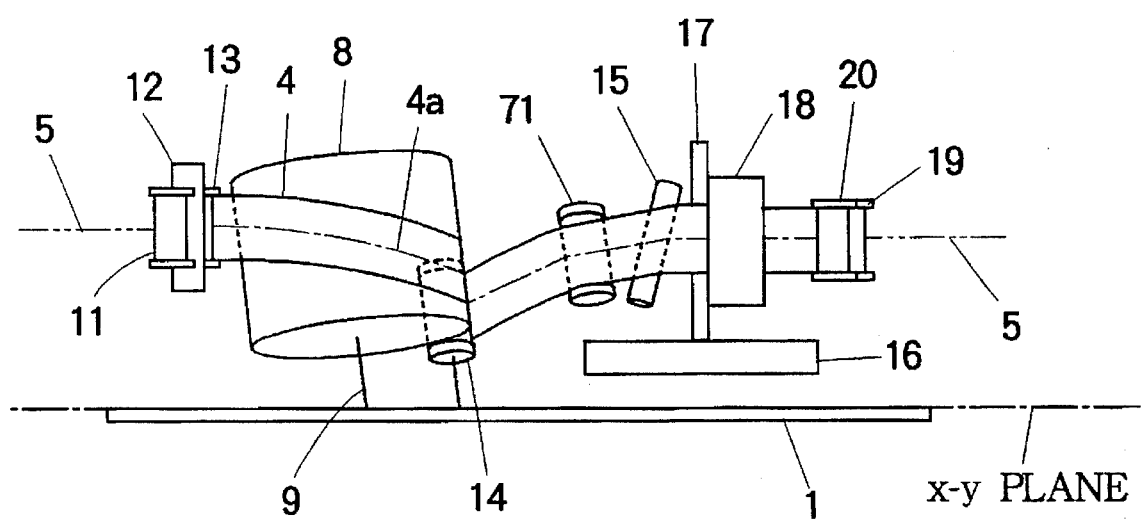
FIG. 18 is a front view schematically showing the device when viewed from a line III—III in FIG. 17.

FIG. 17 is a plan view schematically showing the construction of a magnetic recording and reproducing device according to a third embodiment of this invention, and FIG. 18 is a front view schematically showing the device when viewed from a line III—III in FIG. 17.

The magnetic recording and reproducing device according to the third embodiment differs from that of the first embodiment only in that a guide roller 71 is provided on the deck base 1 between the guide roller 14 on the take-up side and the slanting post 15 such that the guide roller 71 is free to rotate. In FIG. 17 and FIG. 18, therefore, the same reference numbers have been used to indicate parts in the construction of the device which are identical to those of the first embodiment shown in FIG. 1 to FIG. 14, and a description of these parts is omitted.

Table 3 below shows typical of values of diameters, tilt angles with respect to the z axis, direction angles with respect to the x axis and winding angles of the supply reel 2 and take-up reel 3 of the tape cassette 6, rotary head drum 8, and the rollers and post constituting the tape guide mechanism 10 in the magnetic recording and reproducing device according to the third embodiment.

members 26 and 33, and the tape travel path does not gradually shift away from its true path with increasing number of years of use of the device.

Moreover, as the guide roller 14 and the slanting post 15 are provided, the winding angle at the slanting post 15 is reduced, and sharp changes of tape travel direction are avoided. This makes it possible to enhance steadiness of tape travel. Further, the position of the magnetic tape in the width direction may be controlled by the guide roller 71, for example by the flange of the guide roller 71, so errors in the tape travel direction may be reduced. Still further, as the construction comprises only one post between a supply reel 2 of the tape cassette 6 and a capstan 17, the magnetic tape 4 wound on the rotary head drum 8 may be controlled by a low tension, and the running of thin tape is steadied.

Further, the tilt angle of the guide roller 71 with respect to the z axis and the direction angle of the guide roller 71 with respect to the x axis, are the same as the corresponding angles of the guide roller 14, hence the magnetic tape 4 does not become twisted and steadiness of tape running is enhanced.

Embodiment 4

Figure 19:
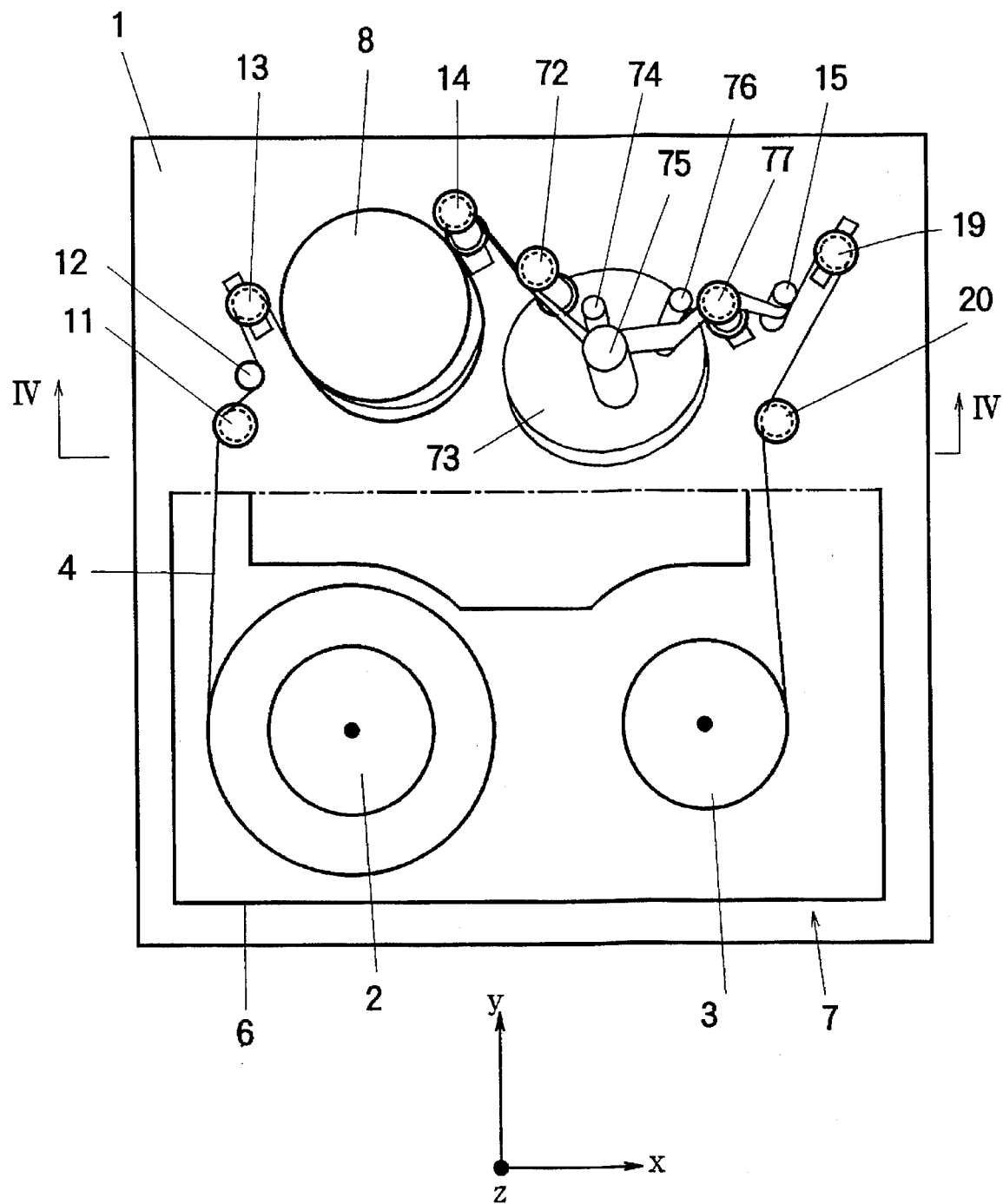
FIG. 19 is a plan view schematically showing the construction of a magnetic recording and reproducing device according to a fourth embodiment of this invention.
Figure 20:
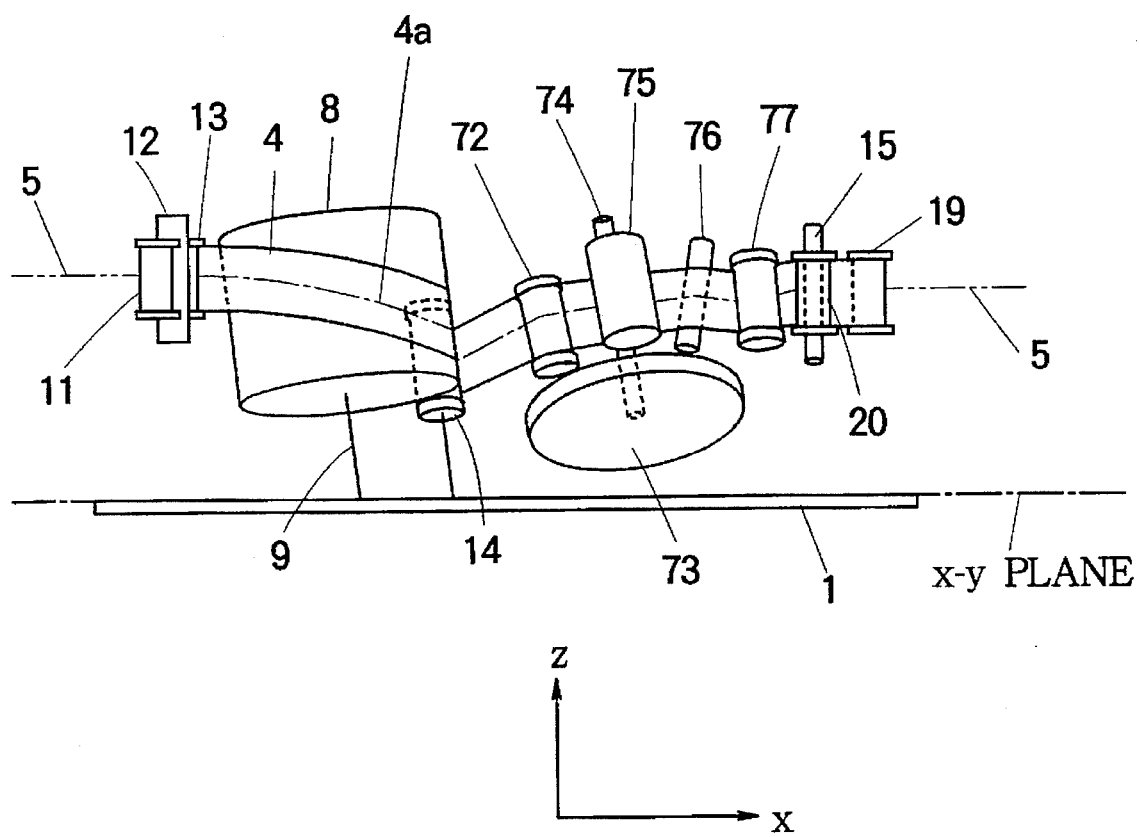
FIG. 20 is a front view schematically showing the device when viewed from a line IV—IV in FIG. 19.

FIG. 19 is a plan view schematically showing the construction of a magnetic recording and reproducing device according to a fourth embodiment of this invention, and FIG. 20 is a front view schematically showing the device when viewed from a line IV—IV in FIG. 19.

The magnetic recording and reproducing device according to the fourth embodiment differs from that of the first

TABLE 3

| NUMERAL | COMPOSITION | DIAMETER [mm] | TILT ANGLE [°] | DIRECTION ANGLE [°] | WINDING ANGLE [°] |
| --- | --- | --- | --- | --- | --- |
| 2 | SUPPLY REEL | 17.0 | 0.0 | — | — |
| 11 | GUIDE ROLLER | 3.0 | 0.0 | — | 43.0 |
| 12 | TENSION ROLLER | 3.0 | 0.0 | — | 71.3 |
| 13 | GUIDE ROLLER | 3.5 | 0.0 | — | 184.0 |
| 8 | ROTARY HEAD DRUM | 20.0 | 10.0 | 110.0 | 185.0 |
| 14 | GUIDE ROLLER | 3.5 | 20.0 | 112.5 | 177.0 |
| 71 | GUIDE ROLL& | 3.0 | 20.0 | 112.5 | 63.0 |
| 15 | SLANTING POST | 2.0 | 25.8 | 44.0 | 47.2 |
| 17 | CAPSTAN | 2.0 | 0.0 | — | 15.0 |
| 18 | PINCH ROLLER | 5.1 | 0.0 | — | 25.0 |
| 19 | GUIDE ROLLER | 3.5 | 0.0 | — | 139.5 |
| 20 | GUIDE ROLLER | 3.0 | 0.0 | — | 16.6 |
| 3 | TAKE-UP REEL | 17.0 | 0.0 | — | — |

In the device according to the third embodiment, as in the case of the first embodiment, high precision tension control can be performed.

According to the device of the third embodiment, the center line 4a of the magnetic tape 4 is made to coincide with the reference plane 5, and the tape travel path is changed so as to be parallel to the reference plane 5, by means of the guide roller 71 and the slanting post 15. The tape travel position can therefore be set more precisely than in the case of the conventional device shown in FIG. 41.

Moreover, according to the magnetic recording and reproducing device of the third embodiment, the moving members 26 and 33 which move in the guide slots 21 and 22 are not provided with slanting posts, a slanting post being fixed only to the deck base 1. The tilt angle and the direction angle of the slanting post 15 therefore do not vary due to dimensional distortions caused by repeated actions of the moving embodiment only in that a guide roller 72 which is free to rotate, a capstan 74 rotated by the driving force of a capstan motor 73, a pinch roller 75, a slanting post 76 fixed on the deck base 1 and a guide roller 77 are provided between the guide roller 14 and the slanting post 15. According to this construction, at the guide roller 14 on the tape take-up side which is situated on the tape departure side of the rotary head drum 8, the magnetic tape 4 which is then at its lowest position is wound on the guide roller 72, the capstan 74, the slanting post 76 and the guide roller 77, and is then wound on the slanting post 15 as shown in FIG. 20. The center line 4a of the magnetic tape 4 is thereby made to coincide with the reference plane 5, and the tape travel path is changed so that it is parallel to the reference plane 5. In FIG. 19 and FIG. 20, the same reference numbers have been used to indicate parts in the construction of the device which are identical to those of the first embodiment shown in FIG. 1 to FIG. 14, and a description of these parts is omitted.

Table 4 below shows typical of values of diameters, tilt angles with respect to the z axis, direction angles with respect to the x axis and winding angles of the supply reel 2 and take-up reel 3 of the tape cassette 6, rotary head drum 8, and the guide rollers and posts constituting the tape guide mechanism 10 in the magnetic recording and reproducing device according to the fourth embodiment.

TABLE 4

| NUMERAL | COMPOSITION | DIAMETER [mm] | TILT ANGLE [°] | DIRECTION ANGLE [°] | WINDING ANGLE [°] |
| --- | --- | --- | --- | --- | --- |
| 2 | SUPPLY REEL | 17.0 | 0.0 | — | — |
| 11 | GUIDE ROLLER | 3.0 | 0.0 | — | 43.0 |
| 12 | TENSION ROLLER | 3.0 | 0.0 | — | 71.3 |
| 13 | GUIDE ROLLER | 3.5 | 0.0 | — | 184.0 |
| 8 | ROTARY HEAD DRUM | 20.0 | 10.0 | 110.0 | 185.0 |
| 14 | GUIDE ROLLER | 3.5 | 20.0 | 112.5 | 169.0 |
| 72 | GUIDE ROLLER | 3.0 | 20.0 | 112.5 | 14.0 |
| 74 | CAPSTAN | 2.0 | 20.0 | 112.5 | 57.0 |
| 75 | PINCH ROLLER | 5.1 | 20.0 | 112.5 | 10.0 |
| 76 | SLANTING POST | 2.0 | 21.4 | 69.4 | 40.0 |
| 77 | GUIDE ROLLER | 3.0 | 9.9 | 108.5 | 72.0 |
| 15 | SLANTING POST | 2.0 | 7.0 | 63.4 | 90.1 |
| 19 | GUIDE ROLLER | 3.5 | 0.0 | — | 182.8 |
| 20 | GUIDE ROLLER | 3.0 | 0.0 | — | 30.6 |
| 3 | TAKE-UP REEL | 17.0 | 0.0 | — | — |

In the device according to the third embodiment, as in the case of the first embodiment, high precision tension control can be performed.

According to the device of the fourth embodiment, the magnetic tape is wound on the guide roller 72, capstan 74, slanting post 76 and guide roller 77, and is then wound on the slanting post 15. The center line 4a of the magnetic tape 4 is thereby made to coincide with the reference plane 5 and the tape travel path is changed so that it is parallel to the reference plane 5. The tape travel position can therefore be set more precisely than in the case of the conventional device shown in FIG. 41.

Moreover, according to the magnetic recording and reproducing device of the fourth embodiment, the moving members 26 and 33 which move in the guide slots 21 and 22 are not provided with slanting posts, slanting posts being fixed only to the deck base 1. The tilt angle and direction of the posts therefore do not vary due to dimensional distortions caused by repeated actions of the moving members 26 and 33, and the tape travel path does not gradually shift away from its true path with increasing number of years of use of the device.

As there are no slanting posts in the tape travel path from the tape departure side of the rotary head drum 8 to the capstan 74 in the device according to the fourth embodiment, the tape tension at the capstan 74 is reduced, and the torque of the driving means driving the capstan 74 can be reduced. A capstan motor 73 may therefore be designed to be more compact and to consume less power.

Since the tilt angle of the capstan 74 with respect to the z axis and the direction angle of the capstan 74 with respect to the x axis, are the same as the corresponding angles of the guide roller 14 and the guide roller 72, the magnetic tape 4 does not become twisted and steadiness of tape running is enhanced.

Embodiment 5

Figure 21:
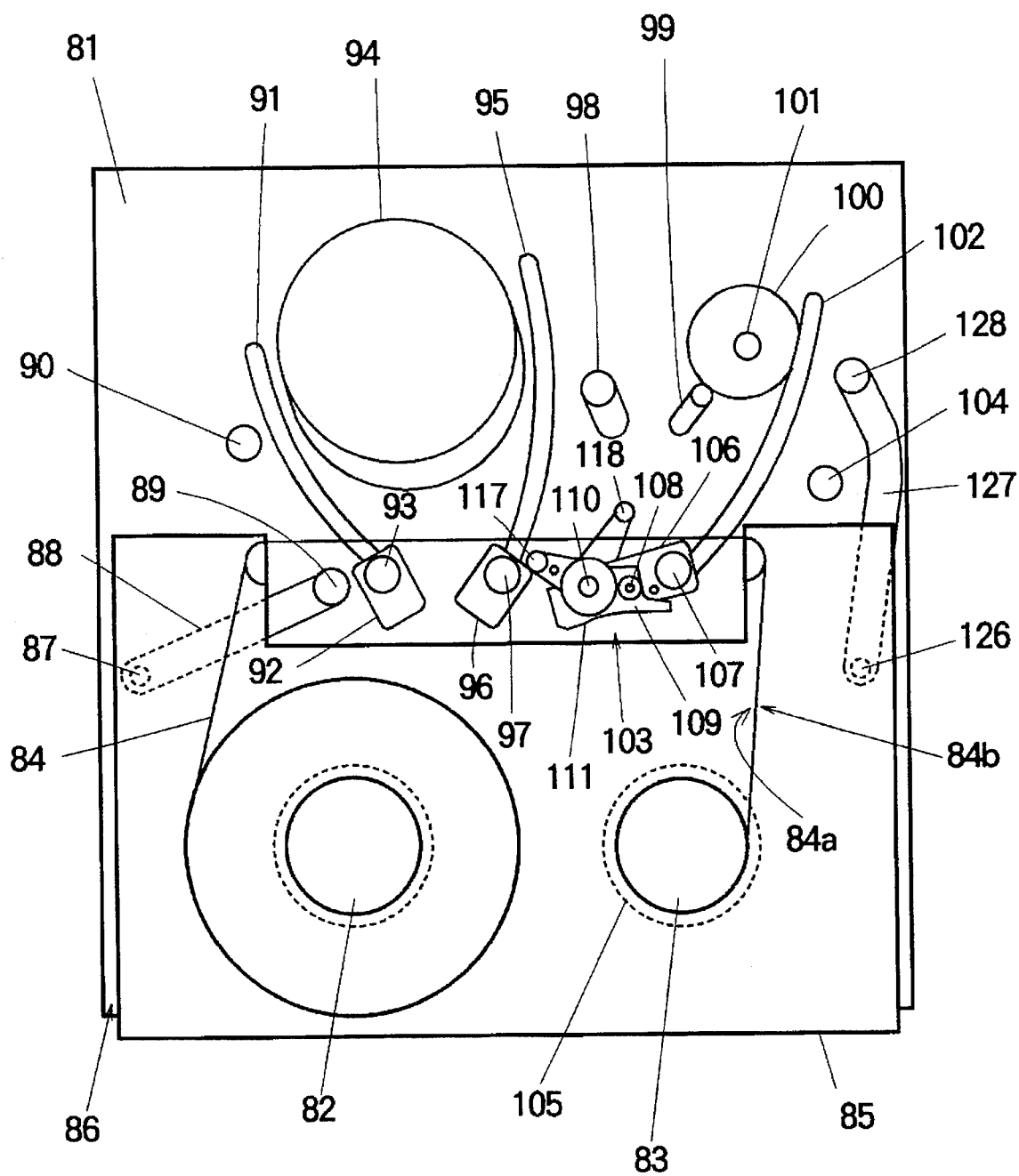
FIG. 21 is a plan view schematically showing the construction of a magnetic recording and reproducing device according to a fifth embodiment of this invention when in the unloaded state.
Figure 22:
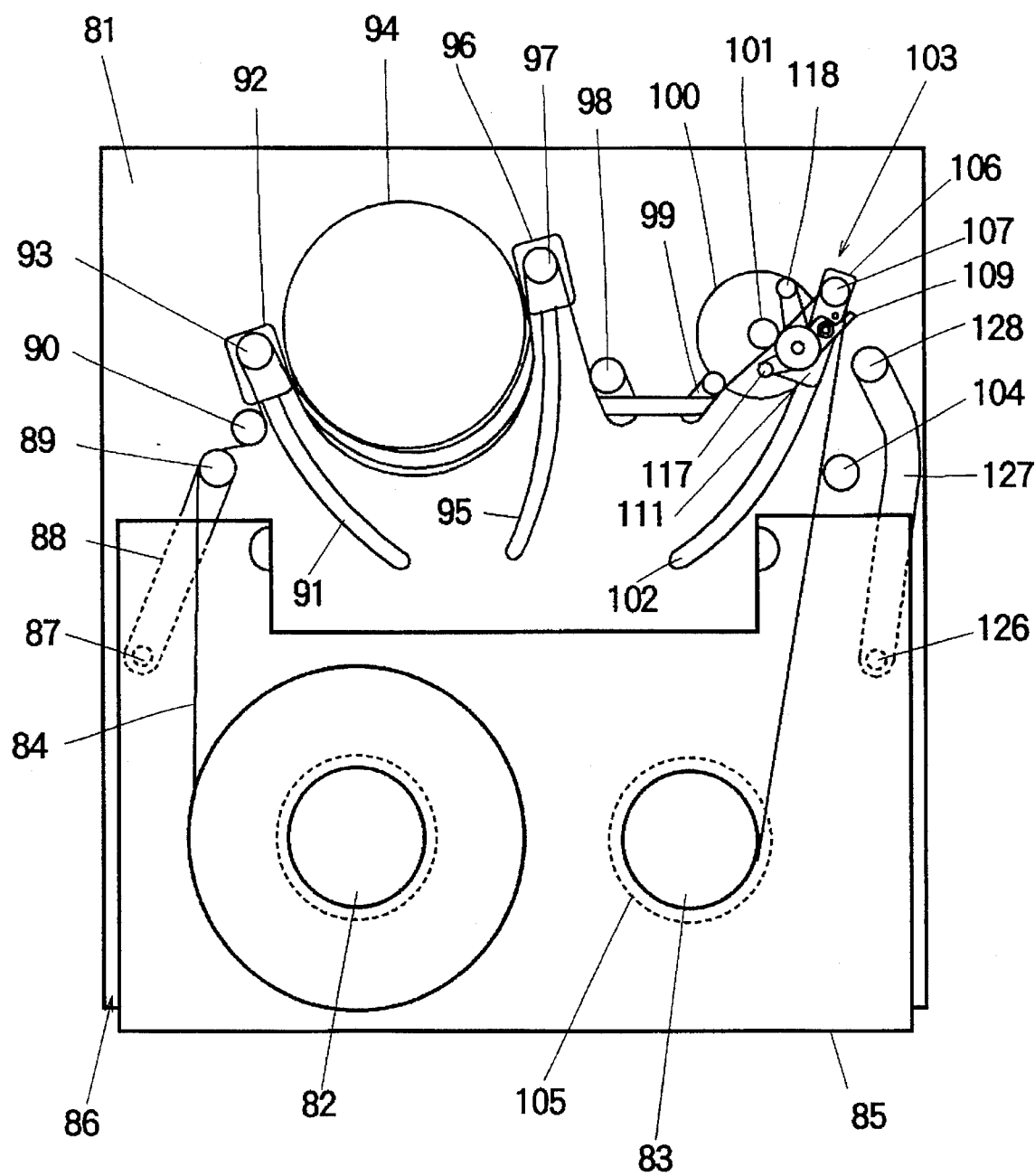
FIG. 22 is a plan view schematically showing the construction of the magnetic recording and reproducing device according to the fifth embodiment when in the loaded state.
Figure 23:
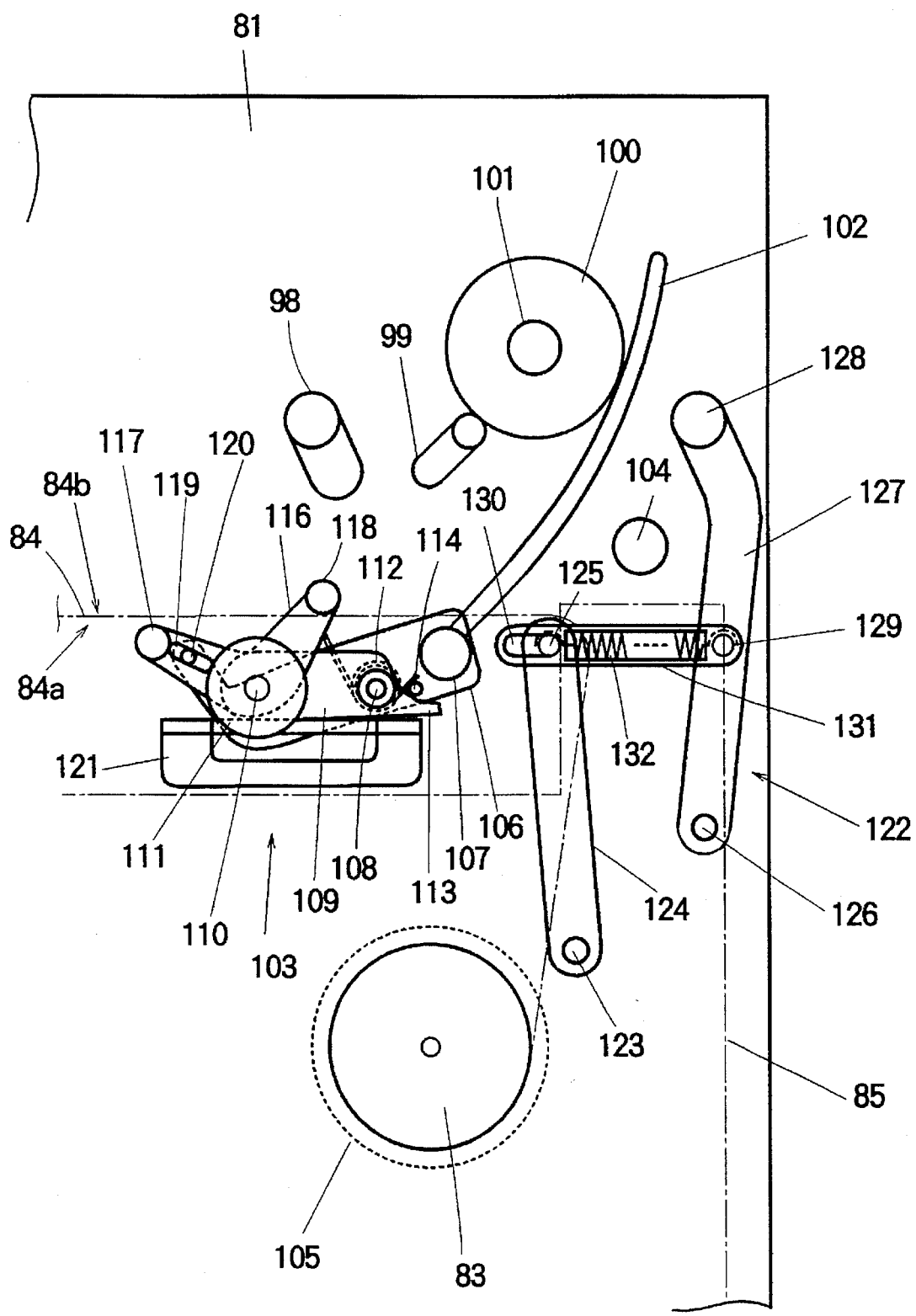
FIG. 23 is a plan view showing the detailed construction of a guide mechanism of the magnetic recording and reproducing device according to the fifth embodiment when in the unloaded state.
Figure 24:
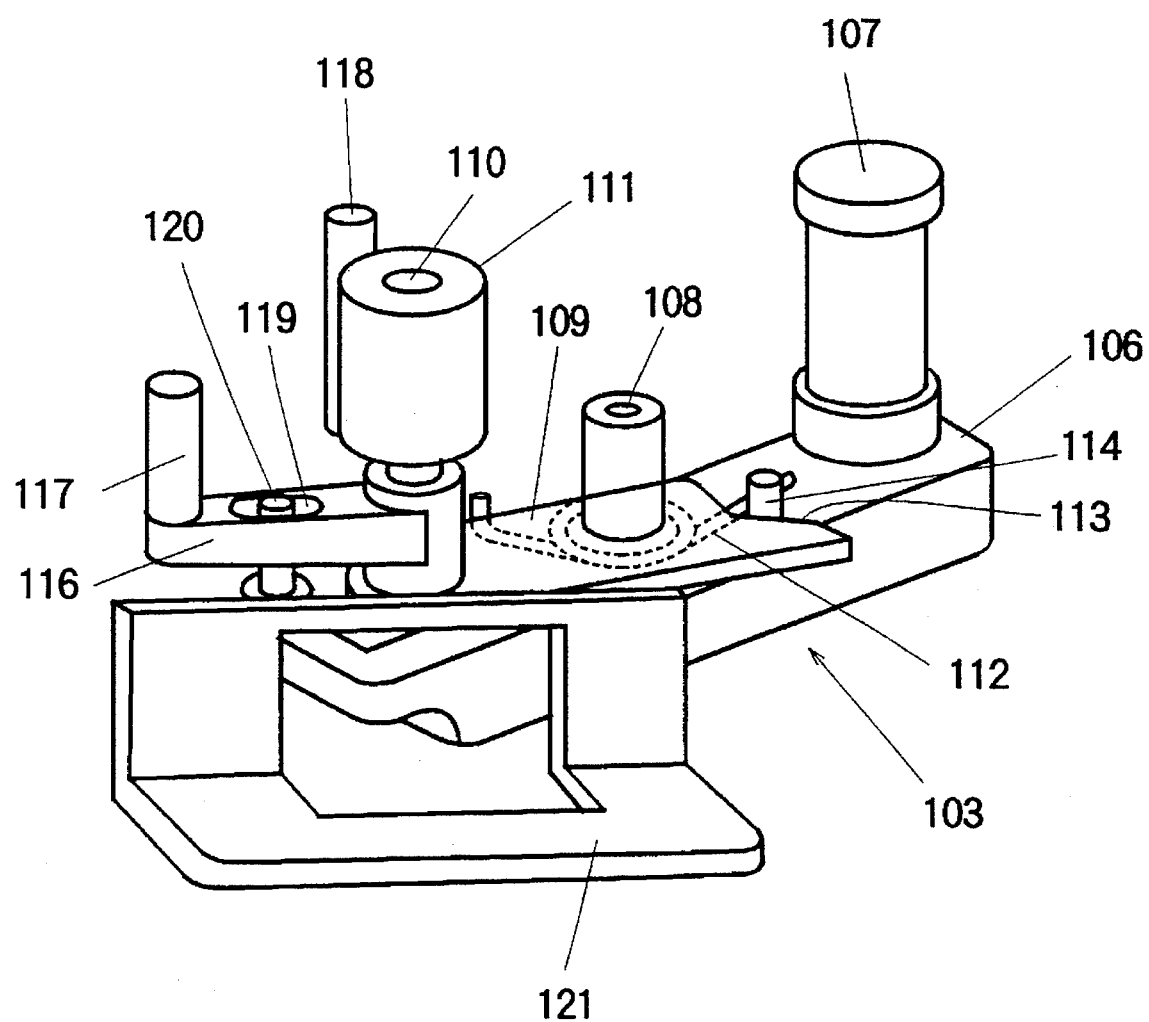
FIG. 24 is a view in perspective showing the detailed construction of the guide mechanism of the magnetic recording and reproducing device according to the fifth embodiment when unloaded state.
Figure 25:
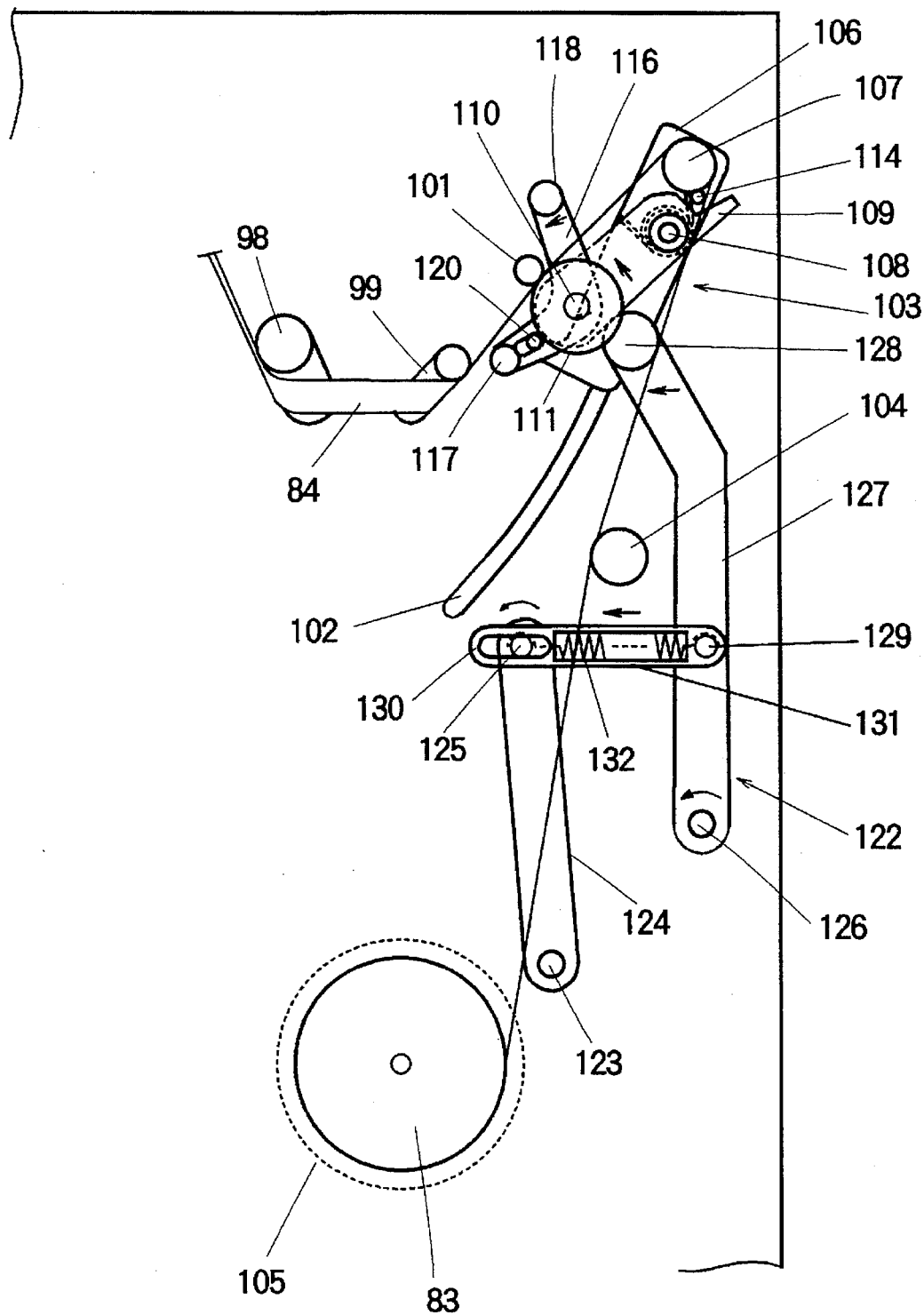
FIG. 25 is a plan view showing a first tape transport mode of the magnetic recording and reproducing device according to the fifth embodiment.
Figure 26:
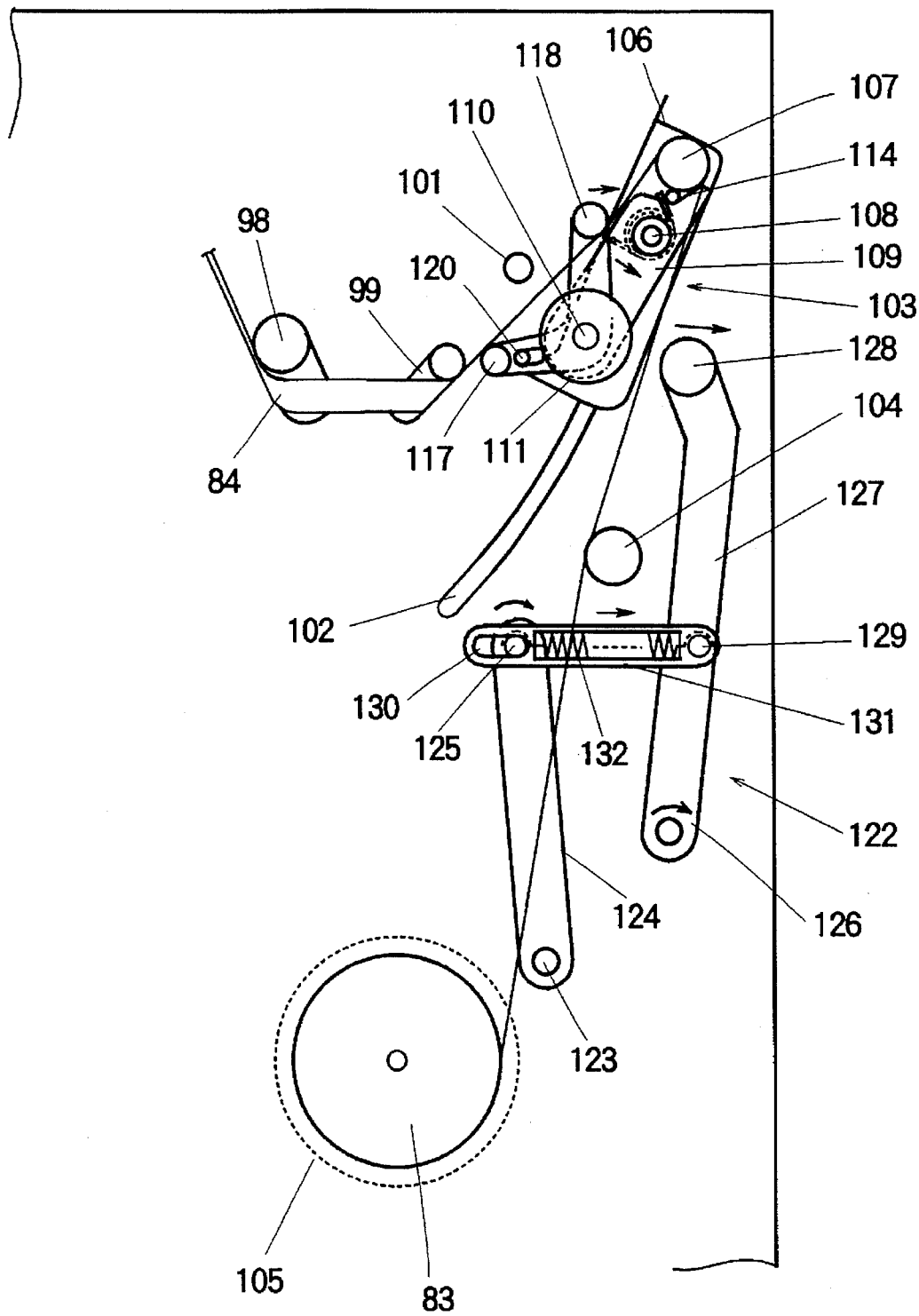
FIG. 26 is a plan view showing a second tape transport mode of the magnetic recording and reproducing device according to the fifth embodiment.
Figure 27:
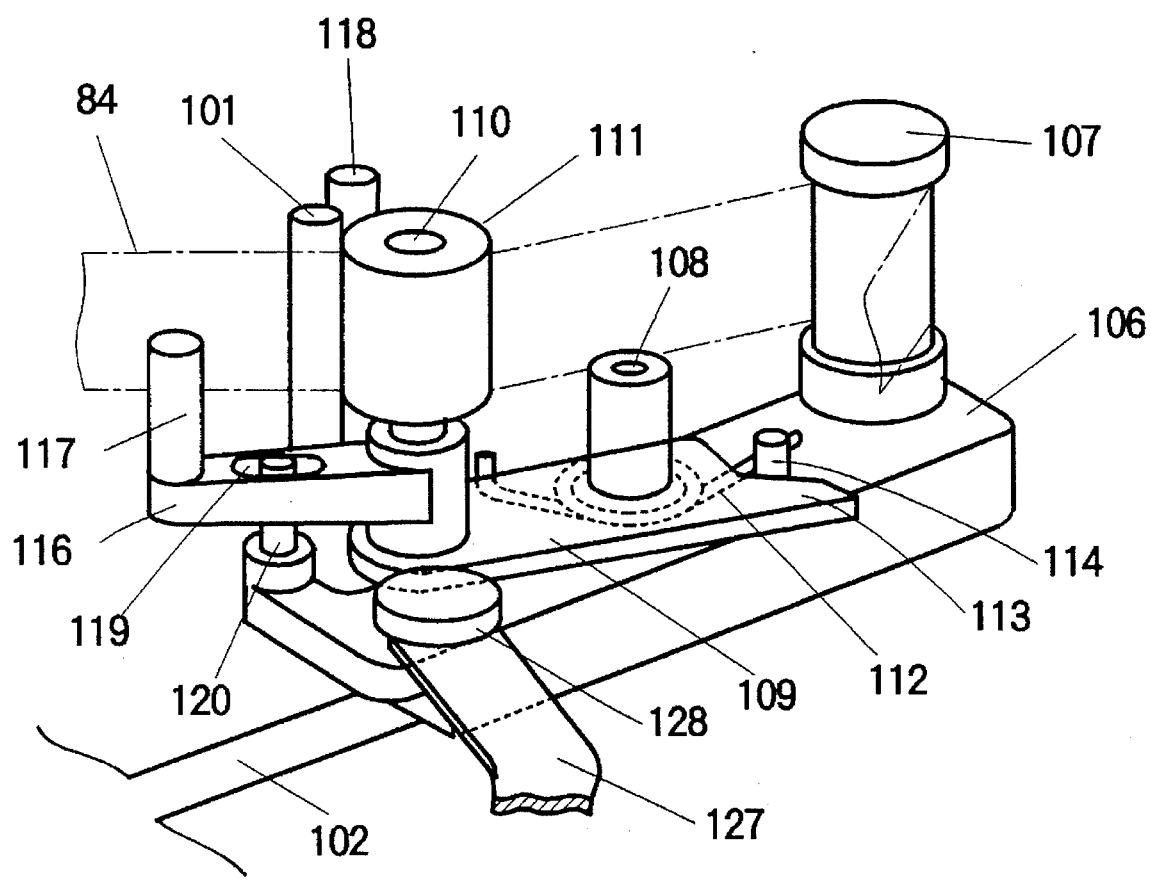
FIG. 27 is a view in perspective showing the detailed construction of a guide mechanism when the mechanism is in the state shown in FIG. 25.
Figure 28:
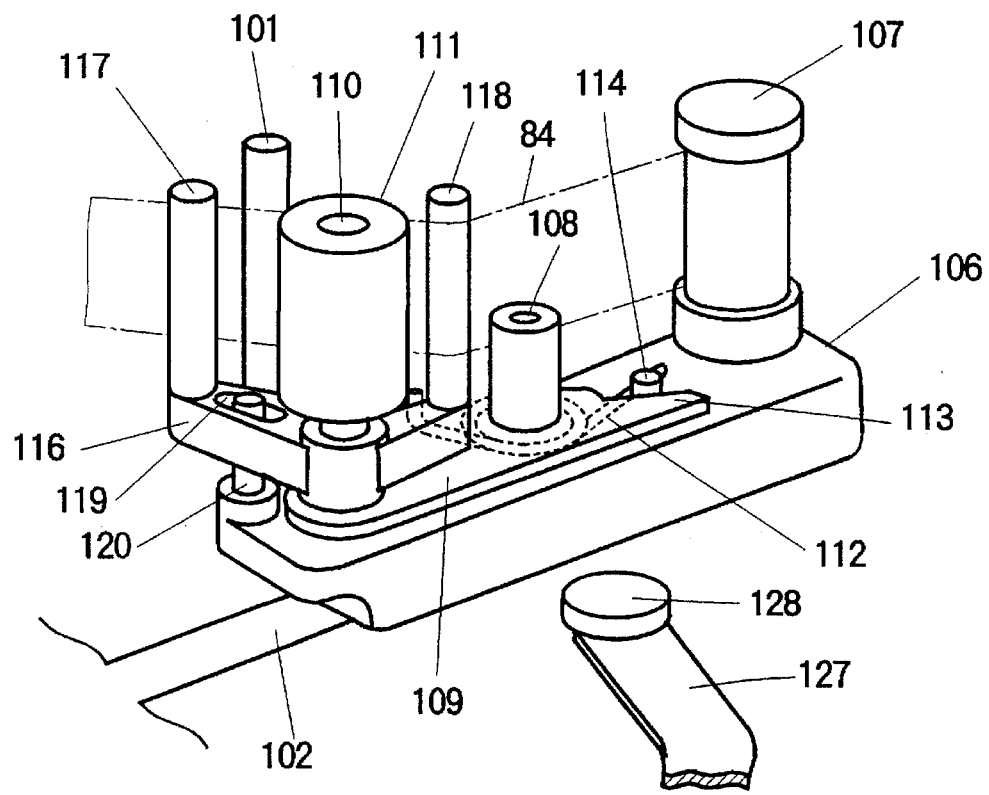
FIG. 28 is a view in perspective showing the detailed construction of a guide mechanism when the mechanism is in the state shown in FIG. 26.

FIG. 21 to FIG. 28 show the construction of a magnetic recording and reproducing device according to a fifth embodiment of this invention. FIG. 21 is a plan view schematically showing the construction of the device when in the unloaded state, and magnetic tape has not been drawn out from a tape cassette. FIG. 22 is a plan view schematically showing the construction of the device when in the loaded state, and the magnetic tape is wound on a rotary head drum. FIG. 23 is a plan view showing the detailed construction of a guide mechanism of the device when in the unloaded state. FIG. 24 is a view in perspective showing the detailed construction of the guide mechanism of the device when in the unloaded state. FIG. 25 is a plan view showing a first tape transport mode of the device wherein the magnetic tape is transported due to the rotation of a capstan. FIG. 26 is a plan view showing a second tape transport mode of the device wherein the magnetic tape is transported due to the rotation of a take-up reel. FIG. 27 is a view in perspective showing the detailed construction of the guide mechanism when the guide mechanism is in the state shown in FIG. 25. FIG. 28 is an oblique view showing the detailed construction of the guide mechanism when the guide mechanism is in the state shown in FIG. 26.

As shown in the figures, the magnetic recording and reproducing device according to the fifth embodiment comprises a deck base 81, a cassette housing 86 which houses a tape cassette 85 wherein a magnetic tape 84 is wound either on a supply reel 82 or a tape-up reel 83, a lever 88 free to pivot on a shaft 87 provided on the deck base 81, a tension pole 89 provided at the end of this lever 88, a guide roller 90 provided on the deck base 81 such that it is free to rotate, a slider 92 which moves along a guide slot 91 formed in the deck base 81, a guide roller 93 on the tape supply side provided on the slider 92 such that the roller 93 is free to rotate, and a rotary head drum 94 which winds the magnetic tape 84 drawn out from the cassette 85 on its outer circumference. This rotary head drum 94 has a center axis aligned at a predetermined angle and direction with respect to the direction perpendicular to the deck base 81.

The magnetic recording and reproducing device according to the fifth embodiment further comprises a slider 96 which moves along a guide slot 95 formed in the deck base 81, a guide roller 97 on the tape take-up side provided on the slider 96 such that the guide roller 97 is free to rotate, an oblique guide roller 98 provided on the deck base 81 such that the guide roller 98 is free to rotate, a slanting post 99 fixed to the deck base 81, a capstan motor 100, and a capstan 101 which is rotated by the driving force of this capstan motor 100. The guide roller 98 has a center axis which has a predetermined tilt angle with respect to the direction perpendicular to the deck base 81 and a predetermined direction angle. Likewise, the slanting post 99 is aligned at a predetermined tilt angle with respect to the direction perpendicular to the deck base 81 and a predetermined direction angle.

The magnetic recording and reproducing device according to the fifth embodiment still further comprises a guide mechanism 103 which moves along a guide slot 102 formed in the deck base 81, a guide roller 104 provided on the deck base 81 such that the guide roller 104 is free to rotate, and a take-up disk (take-up means) 105 which winds the magnetic tape 84 on the take-up reel 83 of the cassette 85 by engaging with the take-up reel 83.

The guide mechanism 103, as shown in FIG. 23 or FIG. 24, comprises a slider 106 which moves along the guide slot 102 in the deck base 81, a guide roller 107 which is implanted in this slider 106, a pinch arm 109 provided free to pivot on a shaft 108 implanted in the slider 106, and a pinch roller 111 provided free to pivot on a shaft 110 implanted in the pinch arm 109. This pinch roller 111, as shown in FIG. 25 or FIG. 26, is either pressed against or separated from the capstan 101 due to the pivoting of the pinch arm 109 about the shaft 108.

The guide mechanism 103 further comprises a torsion spring 112 wound around the shaft 108 so as to push the pinch arm 109 in a counterclockwise direction, a stopper 113 formed at the end of the pinch arm 109, and a stopper pin 114 provided on the slider 106 such that the pin comes into contact with the stopper 113 on the pinch arm 109.

The guide mechanism 103 still further comprises a guide arm 116 provided such that it is free to pivot about a shaft 110 implanted in the pinch arm 109, this guide arm having a flat shape approximately in the form of the letter "V", movable tape guides 117 and 118 provided at the ends of this guide arm 116, an oblong slot 119 provided in the guide arm 116 in the vicinity of the movable tape guide 117, and a pin 120 engaging with the slot 119 in the guide arm 116. In FIG. 23 and FIG. 24, the reference numeral 121 indicates a stopper fixed to the deck base 81, one end of the pinch arm 109 on the slider 106 coming into contact with this stopper 121 when unloaded state.

The magnetic recording and reproducing device of the fifth embodiment further comprises mechanisms which move the sliders 92, 96 and 106 respectively along the guide slots 91, 95 and 102. These mechanisms may have a similar construction to, for example, those shown in FIG. 4 and FIG. 5 of the first embodiment.

The magnetic recording and reproducing device of the fifth embodiment still further comprises a pushing mechanism 122 which rotates the pinch arm 109 of the guide mechanism 103 in a clockwise direction in opposition to the restoring force of the torsion spring 112 in a counterclockwise direction.

This pushing mechanism 122 comprises a drive lever 124 provided such that it is free to pivot about a shaft 123 implanted in the deck base 81, an engaging pin 125 implanted in the end of the drive lever 124, a pinch lever 127 provided such that it is free to pivot about a shaft 126 implanted in the deck base 81, a roller 128 provided at the end of the pinch lever 127 such that the roller 128 is free to rotate, a pin 129 implanted in the pinch lever 127, a link 131 provided on the pin 129 such that the link 131 is free to turn, this link having an oblong slot 130 engaging with the pin 125 of the drive lever 124, and a spring 132 suspended between the pin 125 of the drive lever 124 and the pin 129 of the pinch lever 127, this spring exerting a force tending to pull the drive lever 124 and the pinch lever 127 together. This mechanism for pivoting the drive lever 124 is the same as that of the ninth embodiment described hereinafter (shown in FIG. 40).

Next, the action of the magnetic recording and reproducing device of the fifth embodiment will be described.

As shown in FIG. 21 to FIG. 23, when the device is in the unloaded state, i.e., when the magnetic tape 84 is wound within the cassette 85, the pinch arm 109 of the guide mechanism 103 is in contact with the stopper 121 fixed to the deck base 81. The movable tape guides 117 and 118 are then not in contact with the magnetic tape 84, the guide 117 being situated on the side of a base surface 84a of the magnetic tape 84, and the guide 118 being situated on the side of a magnetic surface 84b of the magnetic tape 84.

When the loading motor (not shown) is operated, the arm 88 provided with the tension pole 89, the slider 92 provided with the guide roller 93 on the supply side, the slider 96 provided with the guide roller 97 on the take-up side, and the slider 106 forming part of the guide mechanism 103 are moved as shown in FIG. 22. The magnetic tape 84 is then drawn out of the cassette 85 by the tension roller 89, guide roller 93, guide roller 97 and guide roller 107, and is wound on the rotary head drum 94.

Next, the action of changing the tape transport mode when in the loaded state, will be described.

As shown in FIG. 25 and FIG. 27, when the first tape transport mode (for example, normal playback mode) wherein the magnetic tape 84 is advanced by the rotation of the capstan 101 is selected, the drive lever 124 swings in a counterclockwise direction, and the pinch lever 127 carrying the pin 129 is pivoted in a counterclockwise direction by the spring 132 in the link 131 suspended between the pin 125 of the drive lever 124 and the pin 129 of the pinch lever 127. When this occurs, the roller 128 at the end of the pinch lever 127 comes into contact with the side of the pinch arm 109 forming part of the guide mechanism 103, the pinch arm 109 turns in a clockwise direction, and the pinch roller 111 presses against the capstan 101 so as to grip the magnetic tape 84. The engaging pin 125 of the drive lever 124 then moves in the middle part of the slot 130 in the link 131, and the spring 132 elongates in the link 131 so that the contact pressure of the pinch roller 111 against the capstan 101 is not excessive.

The guide arm 116 also turns due to the relative positions of the shaft 110 implanted in the pinch arm 109 and the engaging pin 120 implanted in the slider 106, so that the guide arm 116 reaches its furthest position in its counterclockwise rotation about the shaft 110. In this position, as shown in FIG. 25 and FIG. 27, neither of the movable tape guides 117 and 118 with which the guide arm 116 is provided, come into contact with the magnetic tape 84. In the first tape transport mode the magnetic tape 84 is gripped between the capstan 101 and pinch roller 111, and with the movable tape guides 117 and 118 separated from the magnetic tape 84, the magnetic tape 84 is advanced when the capstan 101 is rotated.

When there is a change-over from the first tape transport mode to the second tape transport mode (for example, the fast forward mode), as shown in FIG. 26 and FIG. 28, the drive lever 124 rotates in a clockwise direction, the pin 125 comes into contact with the right end of the slot 130 in the link 131 so as to move the link 131 to the right of the diagram, the pinch lever 127 rotates in a clockwise direction, and the roller 128 moves in a direction away from the pinch arm 109. When this occurs, the pinch arm 109 rotates in a counterclockwise direction due to the counterclockwise restoring force of the torsion spring 112. The pinch arm 109 stops rotating when its stopper 113 comes into contact with the stopper pin 114.

In the position at which the rotation of the pinch arm 109 stops, as shown in FIG. 26 and FIG. 28, the guide arm 116 is in its furthest clockwise rotation position determined by the relative positions of the shaft 110 and the engaging pin 120. In this position, the movable tape guide 117 comes into contact with the base surface 84a of the magnetic tape 84, and the movable tape guide 118 comes into contact with the magnetic surface 84b of the magnetic tape 84. Hence, in the second tape transport mode, the capstan 101 and pinch roller 111 are moved away from the magnetic tape 84, the guides 117 and 118 are brought into contact with the magnetic tape 84 as described hereinbefore, and the magnetic tape 84 is advanced by rotating the take-up disk 105 so as to rotate the take-up reel 83.

As described hereinbefore, according to the magnetic recording and reproducing device of the fifth embodiment, when the first tape transport mode is selected, the capstan 101 and pinch roller 111 grip the magnetic tape 84, the movable tape guides 117 and 118 move away from the magnetic tape, and the magnetic tape is advanced steadily due to the rotation of the capstan 101. On the other hand, when the second tape transport mode is selected, the pinch roller 111 is separated from the capstan 101, and the magnetic tape 84 is brought into contact with the guides 117 and 118 so that the magnetic tape 84 does not come into contact with the capstan 101. In the second tape transport mode, therefore, for example during fast forward mode when the magnetic tape 84 is advanced by rotating the take-up reel 83 or during rewind mode when the magnetic tape 84 is run backward by rotating the supply reel 82, loss of tape magnetism due to the magnetic tape 84 rubbing against the capstan 101 is prevented.

Further, if the position, tilt angle and direction angle of the movable tape guide 117 in the second tape transport mode (in this embodiment, the case is shown when the guide is not tilted) are set so that the winding angle of the magnetic tape 84 at the slanting post 99 is the same in the first tape transport mode and the second tape transport mode, the tape travel path and position do not change due to change-over of tape transport mode, and steadiness of tape travel is consequently enhanced.

Embodiment 6

Figure 29:
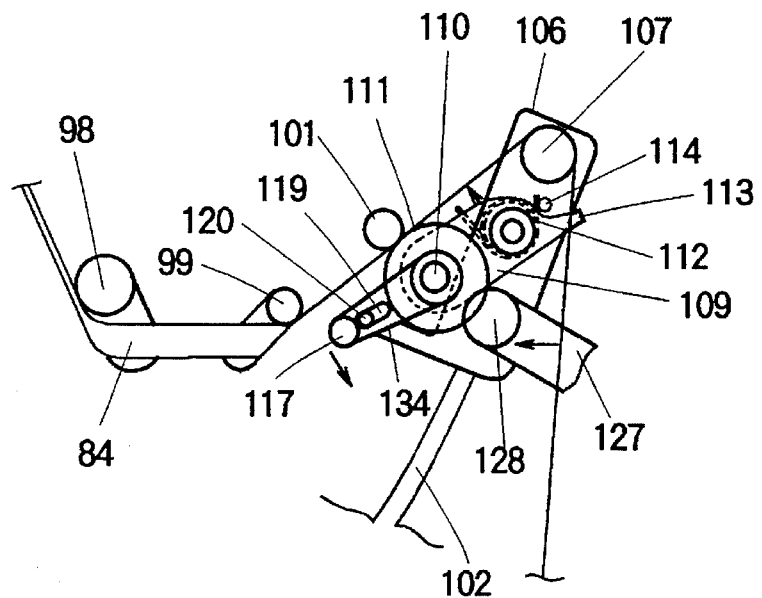
FIG. 29 is a plan view showing the first tape transport mode of the magnetic recording and reproducing device according to a sixth embodiment of this invention.
Figure 30:
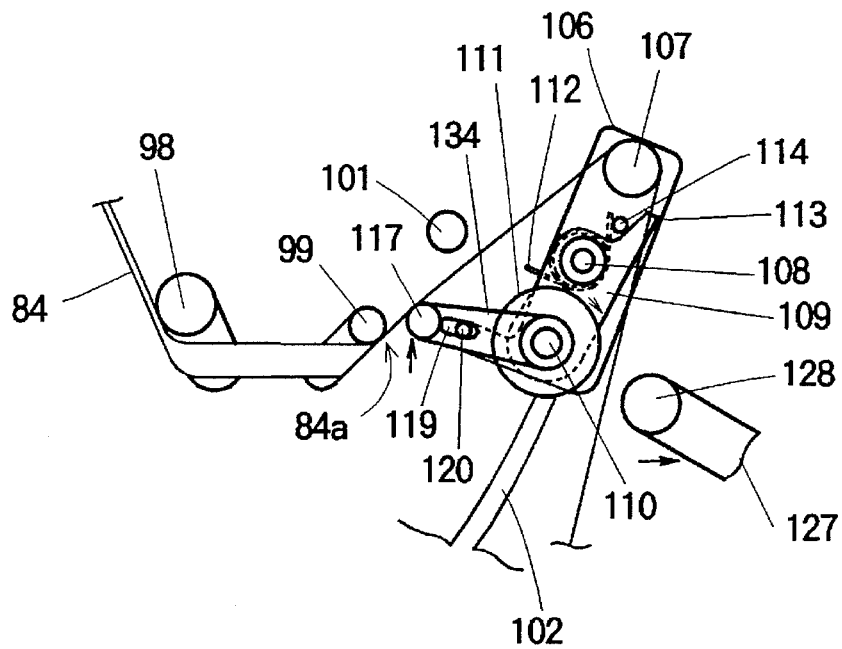
FIG. 30 is a plan view showing the second tape transport mode of the magnetic recording and reproducing device according to the sixth embodiment.
Figure 31:
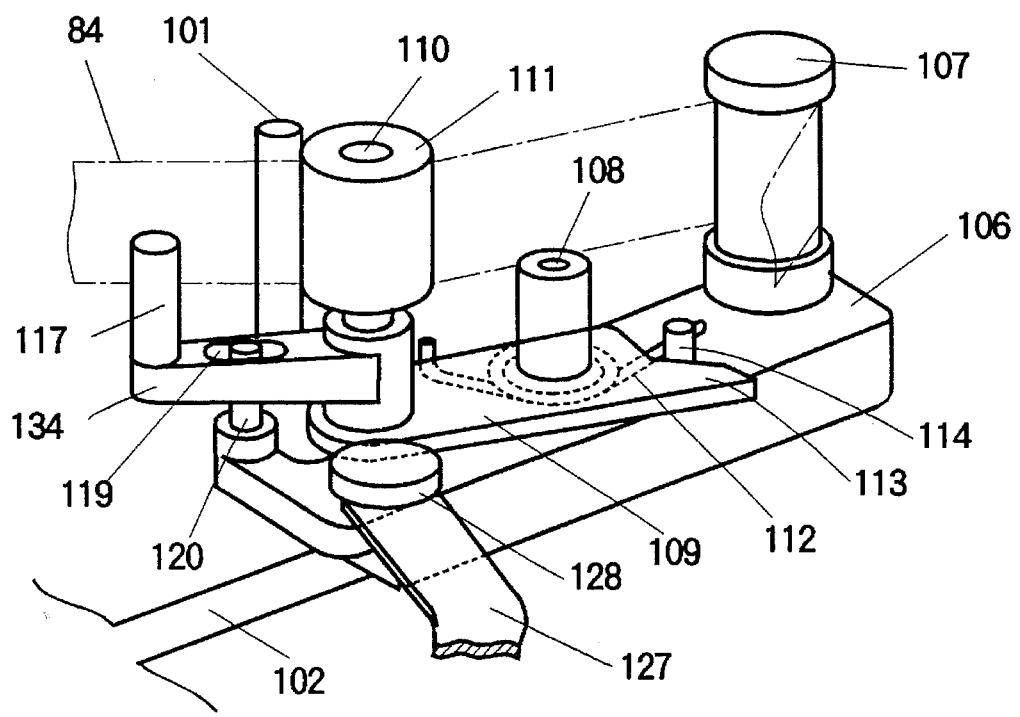
FIG. 31 is a view in perspective showing the guide mechanism when the mechanism is in the state shown in FIG. 29.

FIG. 29 to FIG. 31 show the construction of the guide mechanism of the magnetic recording and reproducing device according to a sixth embodiment of this invention. FIG. 29 is a plan view showing the first tape transport mode, FIG. 30 is a plan view showing the second tape transport mode, and FIG. 31 is a view in perspective showing the guide mechanism when the mechanism is in the state shown in FIG. 29.

The magnetic recording and reproducing device of the sixth embodiment differs from that of the fifth embodiment only in that the flat shape of the pinch arm is not in the form of the letter "V", a pinch arm 134 having a flat shape in the form of the letter "T" as shown in FIG. 29 to FIG. 31, and in that the device does not comprise the movable tape guide 118 of the fifth embodiment. In FIG. 29 to FIG. 31, the same reference numbers have been used to indicate parts in the construction of the device which are identical to those of the fifth embodiment shown in FIG. 21 to FIG. 28, and a description of these parts is omitted.

As shown in FIG. 29 and FIG. 31, when the first tape transport mode (for example, normal playback mode) is selected wherein the magnetic tape 84 is advanced due to the rotation of the capstan 101, the pinch lever 127 pivots in a counterclockwise direction, the roller 128 at the end of the pinch lever 127 comes into contact with the lateral surface of the pinch arm 109 so as to rotate the pinch arm 109 in a clockwise direction, and the pinch roller 111 is pressed against the capstan 101 so as to grip the magnetic tape 84.

The guide arm 134 also turns due to the relative positions of the shaft 110 implanted in the pinch arm 109 and the engaging pin 120 implanted in the slider 106, so that the guide arm 134 reaches its furthest position in its rotation about the shaft 110. In this position, as shown in FIG. 29 and FIG. 31, the movable tape guide 117 with which the guide arm 134 is provided does not come into contact with the magnetic tape 84. In the first tape transport mode the magnetic tape 84 is gripped between the capstan 101 and pinch roller 111, and with the movable tape guide 117 separated from the magnetic tape 84, the magnetic tape 84 is advanced when the capstan 101 is rotated.

When there is a change-over from the first tape transport mode to the second tape transport mode (for example the fast forward mode), as shown in FIG. 30, the pinch lever 127 rotates in a clockwise direction, the roller 128 moves away from the pinch arm 109, and the pinch arm 109 is rotated in a counterclockwise direction due to the counterclockwise restoring force of the torsion spring 112. The pinch arm 109 stops rotating when its stopper 113 comes into contact with the stopper pin 114.

In the position at which the rotation of the pinch arm 109 stops, as shown in FIG. 30, the guide arm 134 is in its furthest clockwise rotation position determined by the relative positions of the shaft 110 and the engaging pin 120. In this position, the movable tape guide 117 comes into contact with the base surface 84a of the magnetic tape 84. Hence, in the second tape transport mode, the guide 117 is brought into contact with the magnetic tape 84, and the magnetic tape 84 is advanced by rotating the take-up reel 83.

According to the magnetic recording and reproducing device of the sixth embodiment as in the device of the fifth embodiment, in the second tape transport mode, for example during fast forward mode or during rewind mode, loss of tape magnetism due to the magnetic tape 84 rubbing against the capstan 101 is prevented.

Further, if the position, tilt angle and direction angle of the movable guide 117 in the second tape transport mode (in this embodiment, the case is shown when the guide is not tilted) are set so that the winding angle of the magnetic tape 84 at the slanting post 99 is the same in the first tape transport mode and the second tape transport mode, the tape travel path and overall orientation do not change due to change-over of tape transport mode, and steadiness of tape travel is consequently enhanced. The remaining features of the construction are identical to those of the device of the fifth embodiment.

Embodiment 7

Figure 32:
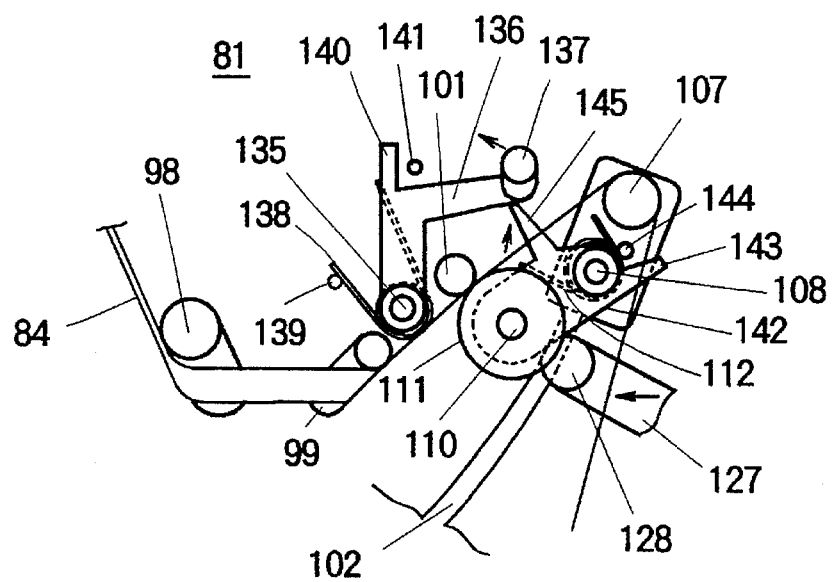
FIG. 32 is a plan view showing the first tape transport mode of the magnetic recording and reproducing device according to a seventh embodiment of this invention.
Figure 33:
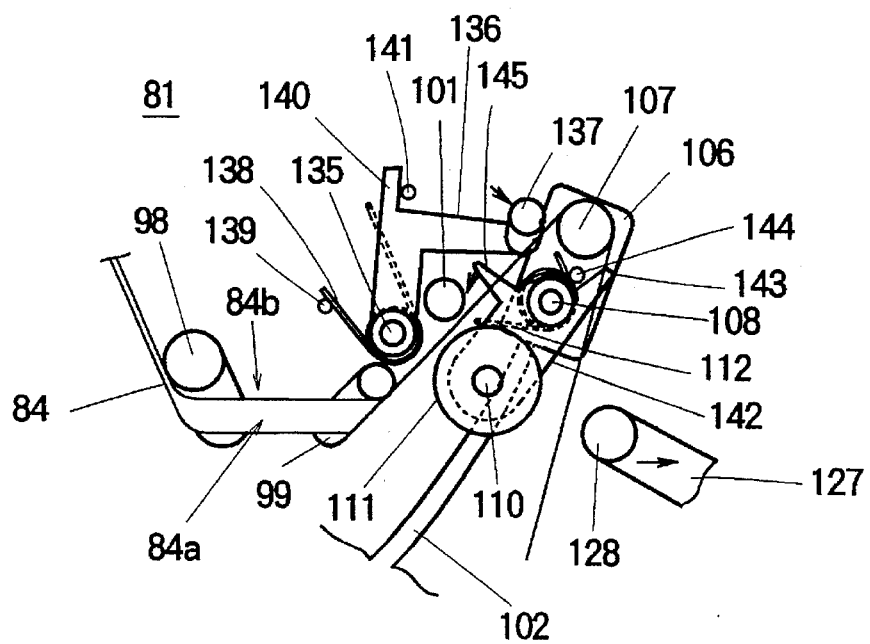
FIG. 33 is a plan view showing the second tape transport mode of the magnetic recording and reproducing device according to the seventh embodiment of this invention.

FIG. 32 and FIG. 33 show the construction of a guide mechanism of a magnetic recording and reproducing device according to a seventh embodiment of this invention. FIG. 32 is a plan view showing the first tape transport mode, and FIG. 33 is a plan view showing the second tape transport mode.

The magnetic recording and reproducing device of the seventh embodiment differs from the device of the fifth embodiment insofar as concerns the construction of the guide mechanism. Using the same reference numerals to indicate parts in the construction of the device which are identical to those of the fifth embodiment, the device of the seventh embodiment comprises a guide arm 136 supported free to pivot about a shaft 135 implanted in the deck base 81, a movable tape guide 137 implanted in the guide arm 136 such that the guide has a predetermined tilt with respect to the direction perpendicular to the deck base 81, a torsion spring 138 wound around the shaft 135, a stopper pin 139 implanted in the deck base 81, a stopper 140 formed at one end of the guide arm 136, and a stopper pin 141 implanted in the deck base 81 such that it comes into contact with the stopper 140. One end of the torsion spring 138 is attached to the stopper pin 139 implanted in the deck base 81, the other end of the spring 138 being attached to the guide arm 136 so that the guide arm 136 is pushed in a clockwise direction by the spring. The device of the seventh embodiment further comprises a pinch arm 142 free to pivot about a shaft 108 provided in the slider 106, a stopper pin 144 implanted in the slider 106, and a projection 145 formed at one end of the pinch arm 142 which is either in contact with or separated from the pinch arm 136. The remaining features of the construction are identical to those of the device of the fifth embodiment.

As shown in FIG. 32, when the first tape transport mode (for example, normal playback mode) is selected wherein the magnetic tape 84 is advanced due to the rotation of the capstan 101, the pinch lever 127 pivots in a counterclockwise direction, the roller 128 at the end of the pinch lever 127 comes Into contact with the lateral surface of the pinch arm 142 so as to rotate the pinch arm 142 in a clockwise direction, and the pinch roller 111 is pressed against the capstan 101 so as to grip the magnetic tape 84. The projection 145 formed on the pinch arm 142 then comes into contact with the guide arm 136, the guide arm 136 is rotated in a counterclockwise direction in opposition to the restoring force of the torsion spring 138, and the guide 137 with which the guide arm 136 is provided reaches a position at which it is not in contact with the magnetic tape 84. In the first tape transport mode the magnetic tape 84 is gripped between the capstan 101 and pinch roller 111, and with the movable tape guide 137 separated from the magnetic tape 84, the magnetic tape 84 is advanced when the capstan 101 is rotated.

When there is a change-over from the first tape transport mode to the second tape transport mode (for example the fast forward mode), as shown in FIG. 33, the pinch lever 127 rotates in a clockwise direction, the roller 128 moves away from the pinch arm 142, and the pinch arm 142 is rotated in a counterclockwise direction due to the counterclockwise restoring force of the torsion spring 112. The pinch arm 142 stops rotating when its stopper 143 comes into contact with the stopper pin 144.

In the position at which the rotation of the pinch arm 142 stops, as shown in FIG. 33, the guide arm 136 rotates in a clockwise direction due to the clockwise restoring force of the torsion spring 138, and this rotation continues until the stopper 140 formed at one end of the guide arm 136 comes into contact with the stopper pin 141. In this position, the magnetic surface 84b of the magnetic tape 84 comes into contact with the guide 137. Hence, in the second tape transport mode, the movable tape guide 137 is brought into contact with the magnetic tape 84, and the magnetic tape is advanced due to the rotation of the take-up reel.

According to the magnetic recording and reproducing device of the seventh embodiment as in the device of the fifth embodiment, in the second tape transport mode, for example during fast forward mode or during rewind mode, loss of tape magnetism due to the magnetic tape 84 rubbing against the capstan 101 is prevented.

In the second tape transport mode, the magnetic surface 84b of the magnetic tape 84 comes into contact with the movable tape guide 137, however loss of tape magnetism can be avoided by constructing the guide 137 of a non-magnetic material.

Further, if the position, tilt angle and direction angle of the guide 137 in the second tape transport mode are set so that the winding angle of the magnetic tape 84 at the slanting post 99 is the same in the first tape transport mode and the second tape transport mode, the tape travel path and position do not change due to change-over of tape transport mode, and steadiness of tape travel is consequently enhanced.

Further, the position, tilt angle and direction angle of the movable tape guide 137 are set so that the magnetic tape 84 does not become twisted as it travels from the movable tape guide 137 to the guide roller 107 in the second tape transport mode.

The position, tilt angle and direction angle of the movable tape guide 137 may be computed by means of the following equations (1), (2) and (3) which are disclosed for example in Japanese Patent Kokai Publication No. H03-78150 (78150/1991).

PARALLEL CONDITION $$\tan\alpha = \frac{\cos\xi\tan\eta - \cos\theta\sin\xi}{\sin\theta\sin\beta + \cos\theta\cos\xi\cos\beta + \sin\xi\cos\beta\tan\eta} \quad (1)$$

HEIGHT CONDITION $$\tan\alpha = \frac{\sin\theta\sin\xi - \theta\tan\eta\cos\xi - A(\pi + \beta)\tan S - B\sin S}{-\sin\theta\cos\beta\cos\xi - (1 - \cos\theta)\sin\beta - \theta\tan\eta\sin\xi\cos\beta - A\sin\beta - \cos S\cos\beta} \quad (2)$$

NO TWISTING CONDITION $$\tan\gamma = \frac{-\sin\theta\cos\beta + \cos\theta\cos\xi\sin\beta + \tan\eta\sin\xi\sin\beta}{\sin\theta\sin\beta\cos\alpha + \cos\theta\cos\xi\cos\beta\cos\alpha + \tan\eta\sin\xi\cos\beta\cos\alpha - \cos\theta\sin\xi\sin\alpha + \tan\eta\cos\xi\sin\alpha} \quad (3)$$

Equation 1 is a parallel condition equation to set the direction of the center line of the magnetic tape 84 between the movable tape guide 137 and the guide roller 107 so that it is parallel to the deck base 81. Equation 2 is a height condition equation to set the height of the center line of the magnetic tape 84 (distance from the deck base 81) between the movable tape guide 137 and the guide roller 107 so that it coincides with the height of the center line of the magnetic tape 84 wound on the tape cassette housed in the cassette housing. Equation 3 is an equation to set the condition that twisting does not occur in any part of the magnetic tape 84.

In these equations, $\alpha$ is the tilt angle of the slanting post 99 with respect to the direction perpendicular to the deck base 81, $\beta$ is the winding angle of the magnetic tape 84 with respect to the slanting post 99, $\gamma$ is the direction angle of the movable tape guide 137, $\eta$ is the tilt angle of the movable tape guide 137 with respect to the direction perpendicular to the deck base 81, $\xi$ is the tilt angle of the movable tape guide 137 to the direction running parallel to the magnetic tape 84 between the slanting post 99 and the movable tape guide 137 (i.e. the arrival angle of the magnetic tape 84 at the movable tape guide 137), and $\theta$ is the winding angle of the magnetic tape 84 at the movable tape guide 137. Further, D is the diameter of the slanting post 99, r is the radius of the movable tape guide 137, A=D/(2r), L is the length of the magnetic tape 84 from the point at which it leaves the slanting post 99 to the point at which it arrives at the movable tape guide 137, B=L/r, and S is the arrival angle of the magnetic tape 84 from the slanting post 99.

D, r and α are constants, and γ, η and ξ are in a relation which satisfies the conditions defined by the following equations (4) and (5):

$$\cos\eta = -\sin\alpha \cos\beta \sin\xi + \cos\alpha \cos\xi \quad (4)$$

$$\sin\gamma = (\sin\xi \sin\beta)/\sin\eta \quad (5)$$

The position of the guide roller 107 in the tape path in the second tape transport mode is the same as its position in the first tape transport mode. Here, there are five unknowns, i.e. L, γ, η, θ and ξ, and they can be solved uniquely by the set of five equations (1) to (5).

The remaining features of the construction are identical to those of the device of the fifth embodiment.

Embodiment 8

Figure 34:
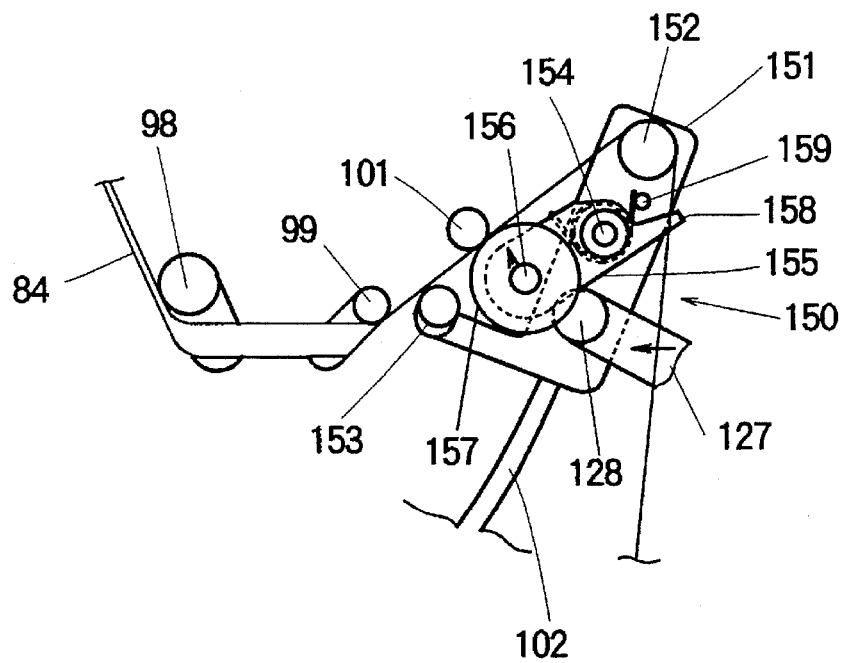
FIG. 34 is a plan view showing the first tape transport mode of the magnetic recording and reproducing device according to an eighth embodiment of this invention.
Figure 35:
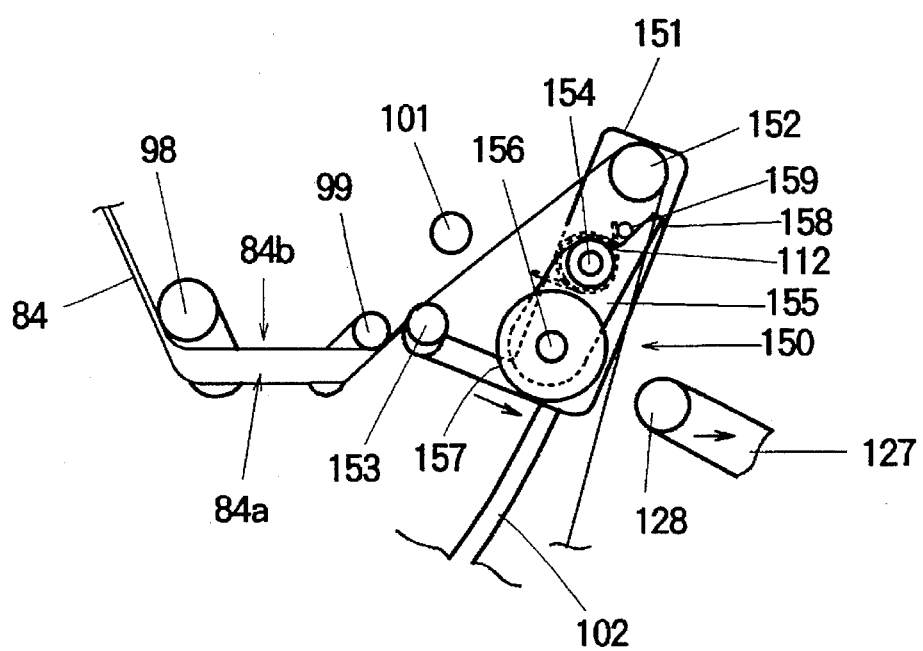
FIG. 35 is a plan view showing the second tape transport mode of the magnetic recording and reproducing device according to the eighth embodiment of this invention.
Figure 36:
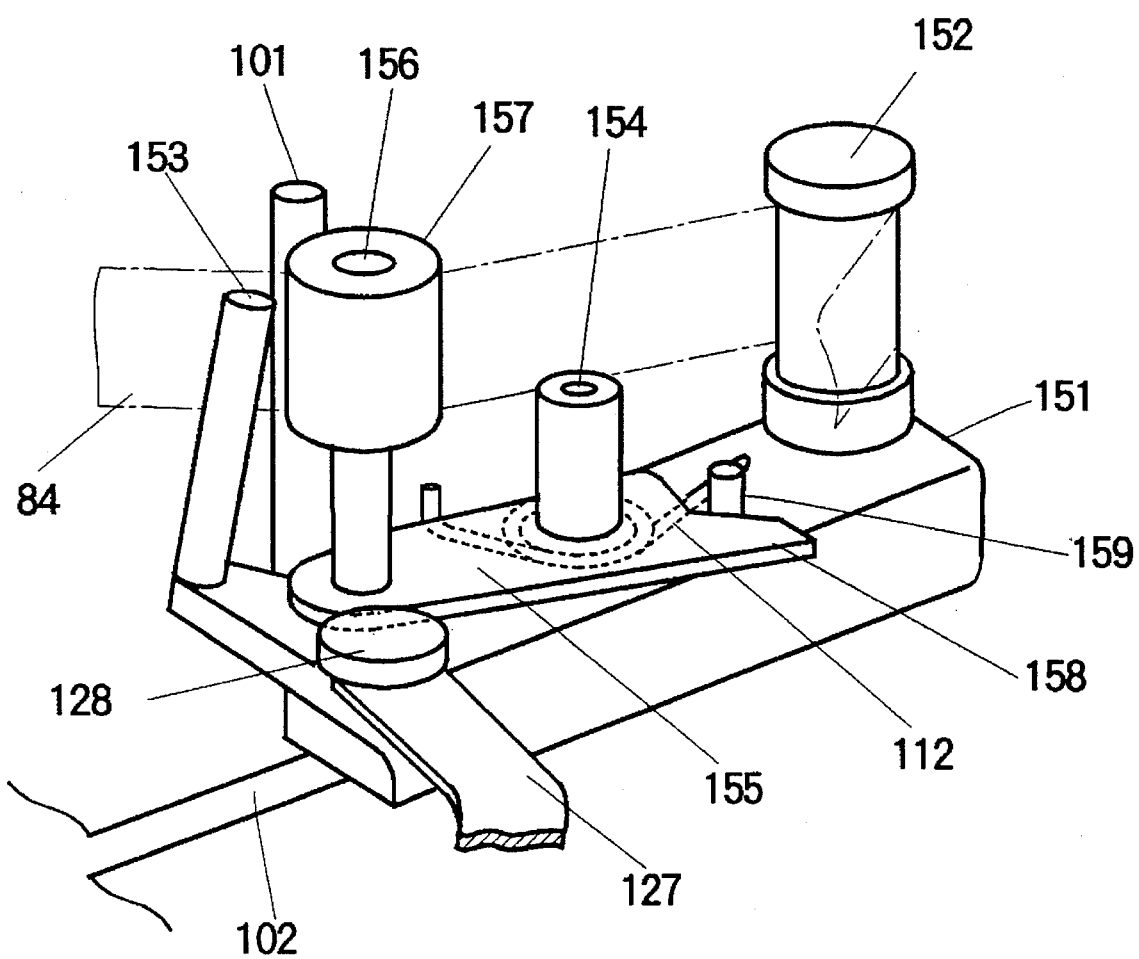
FIG. 36 is a view in perspective showing a guide mechanism when the mechanism is in the state shown in FIG. 34.

FIG. 34 to FIG. 36 show the construction of a guide mechanism of a magnetic recording and reproducing device according to an eighth embodiment. FIG. 34 is a plan view showing a first tape transport mode, FIG. 35 is a plan view showing a second tape transport mode, and FIG. 36 is a view in perspective showing the guide mechanism when the mechanism is in the state shown in FIG. 34.

In the magnetic recording and reproducing device of the eighth embodiment, the construction of the guide mechanism differs from that of the device of the fifth embodiment. In FIG. 34 to FIG. 36, using the same reference numerals to indicate parts in the construction of the device which are identical to those of the fifth embodiment, a guide mechanism 150 of the magnetic recording and reproducing device of the eighth embodiment comprises a slider 151 which moves along a guide slot 102, a guide roller 152 implanted in one end of this slider 151, a tape guide 153 implanted obliquely in the other end of the slider 151, a pinch arm 155 free to turn about a shaft 154 implanted in the slider 151, and a pinch roller 157 free to turn about a shaft 156 implanted in this pinch arm 155. When loaded state, this pinch roller 157 is either pressed against or separated from the capstan 101 due to the rotation of the pinch arm 155 about the shaft 154.

The guide mechanism 150 further comprises the torsion spring 112 wound around the shaft 154 so as to push the pinch arm 155 in a counterclockwise direction, a stopper 158 formed at the end of the pinch arm 155, and a stopper pin 159 which comes into contact with this stopper 158.

As shown in FIG. 34 and FIG. 36, when the first tape transport mode (for example, normal playback mode) is selected wherein the magnetic tape 84 is advanced due to the rotation of the capstan 101, the pinch lever 127 pivots in a counterclockwise direction, the roller 128 at the end of the pinch lever 127 comes into contact with the lateral surface of the pinch arm 155 so as to rotate the pinch arm 155 in a clockwise direction, and the pinch roller 157 is pressed against the capstan 101 so as to grip the magnetic tape 84. The construction is such that the tape guide 153 implanted in the slider 151 does not come into contact with the magnetic tape 84 at that time. In the first tape transport mode, the magnetic tape 84 is gripped between the capstan 101 and the pinch roller 157, and the magnetic tape 84 is advanced due to the rotation of the capstan 101 with the tape guide 153 separated from the magnetic tape 84.

When there is a change-over from the first tape transport mode to the second tape transport mode (for example, the fast forward mode), as shown in FIG. 35, the pinch lever 127 rotates in a clockwise direction, the roller 128 moves away from the pinch arm 142, and the pinch arm 155 is rotated in a counterclockwise direction due to the counterclockwise restoring force of the torsion spring 112. The pinch arm 155 stops rotating when its stopper 158 comes into contact with the stopper pin 159.

In the position at which the rotation of the pinch arm 155 stops, as shown in FIG. 35, the base surface 84a of the magnetic tape 84 comes into contact with the tape guide 153. Hence, in the second tape transport mode, the tape guide 153 is brought into contact with the base surface 84a of the magnetic tape 84, and the magnetic tape 84 is advanced due to the rotation of the take-up reel.

According to the magnetic recording and reproducing device of the eighth embodiment as in the device of the fifth embodiment, in the second tape transport mode, for example during fast forward mode or during rewind mode, loss of tape magnetism due to the magnetic tape 84 rubbing against the capstan 101 is prevented. Further, if the position, tilt angle and direction angle of the tape guide 153 in the second tape transport mode are set so that the winding angle of the magnetic tape 84 at the slanting post 99 is the same in the first tape transport mode and the second tape transport mode, twisting of the magnetic tape 84 can be avoided. The conditions for avoiding twisting may be determined from Equations (1) to (5) of the seventh embodiment.

The remaining features of the construction are identical to those of the device of the fifth embodiment.

Embodiment 9

Figure 37:
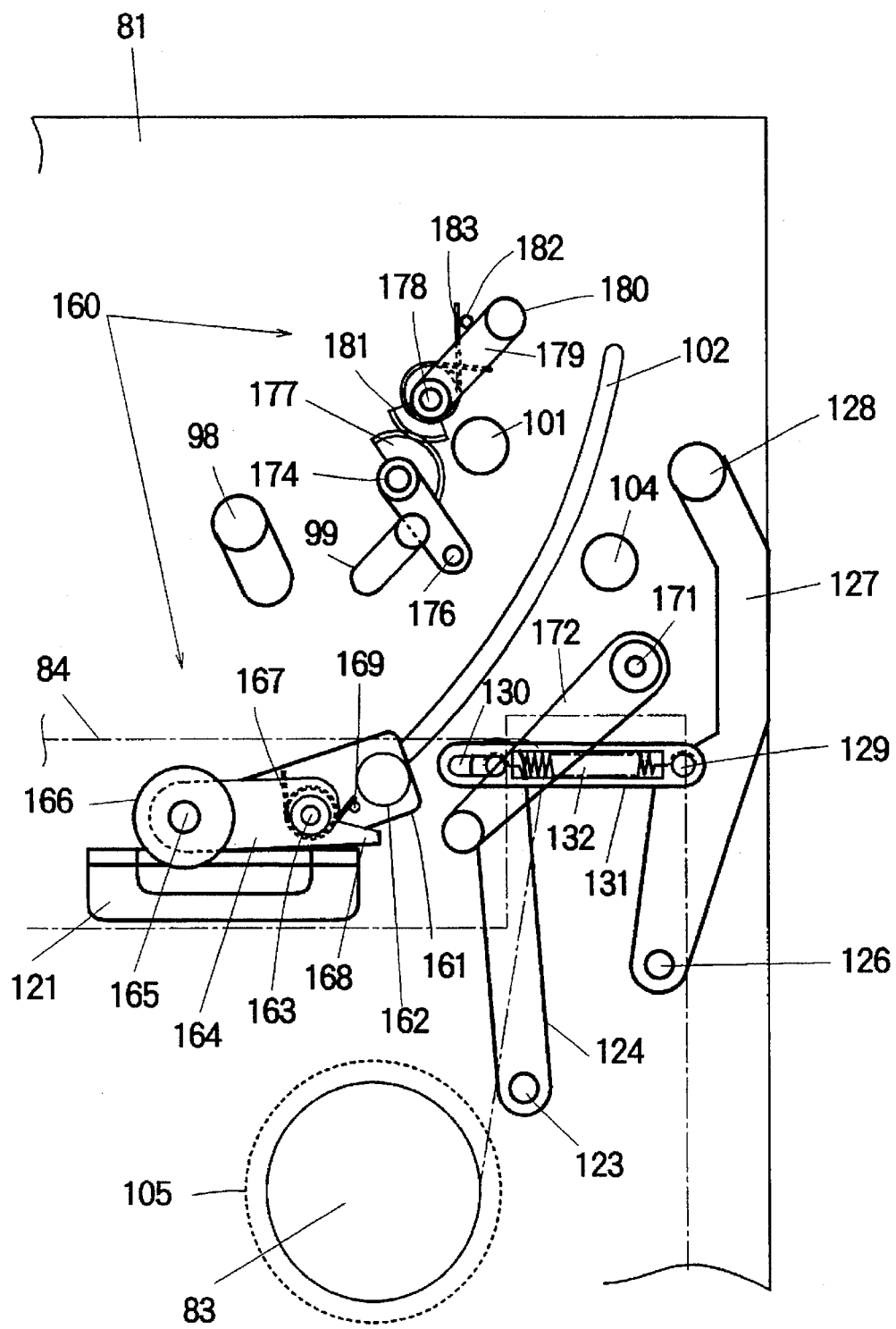
FIG. 37 is a plan view schematically showing the construction of a magnetic recording and reproducing device according to a ninth embodiment of this invention when in the unloaded state.
Figure 38:
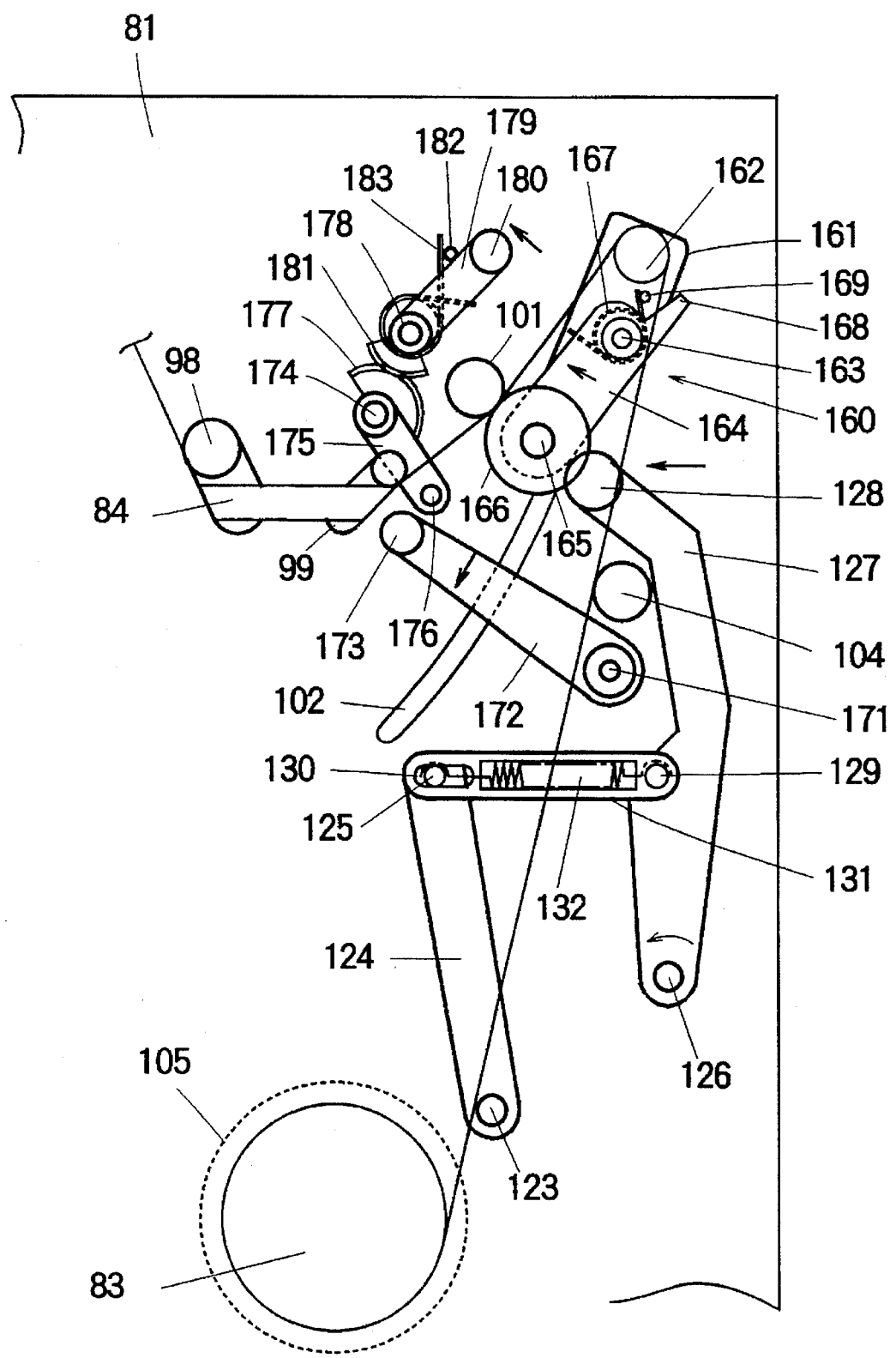
FIG. 38 is a plan view showing the first tape transport mode of the magnetic recording and reproducing device according to the ninth embodiment.
Figure 39:
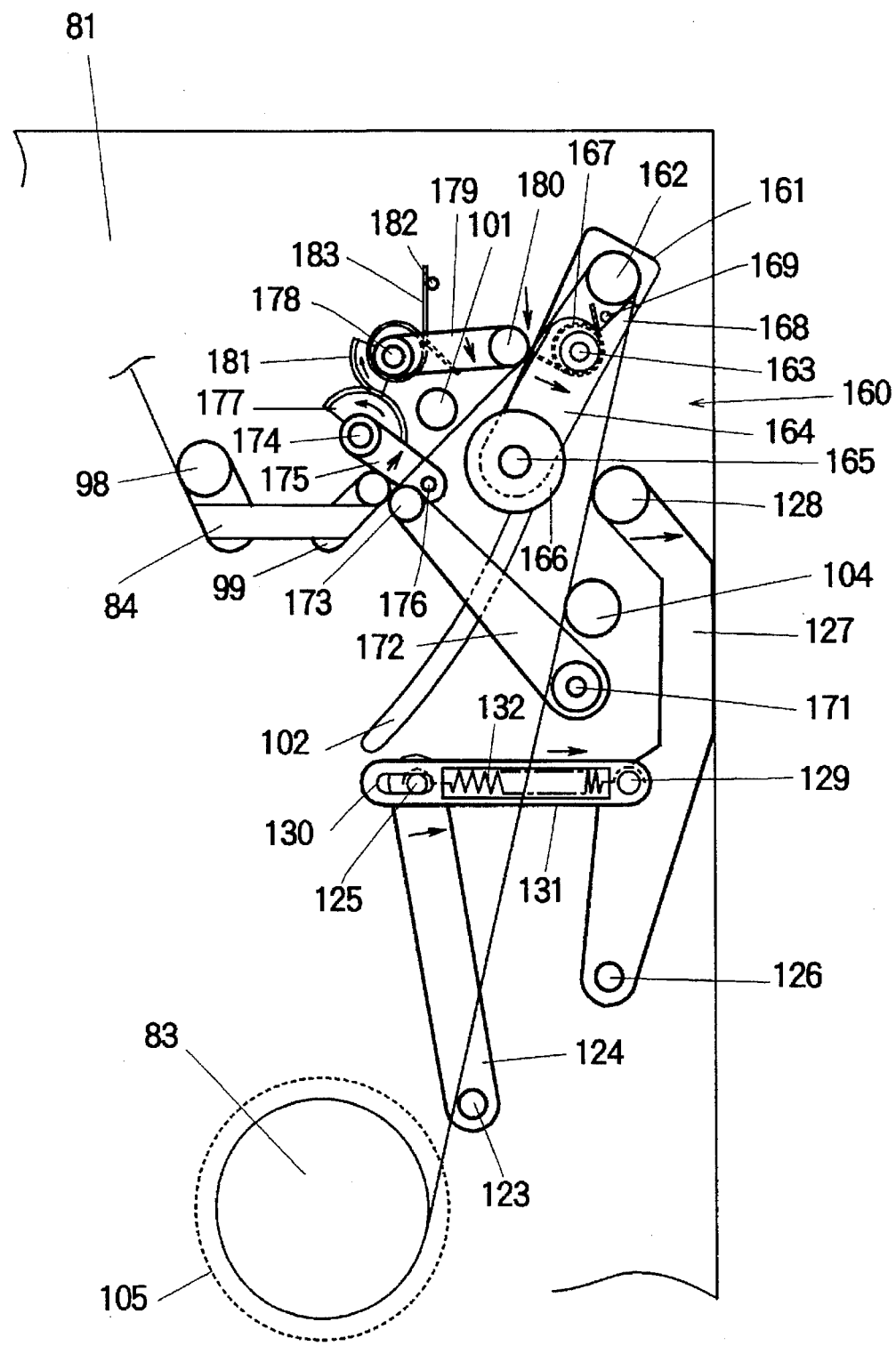
FIG. 39 is a plan view showing the second tape transport mode of the magnetic recording and reproducing device according to the ninth embodiment.
Figure 40:
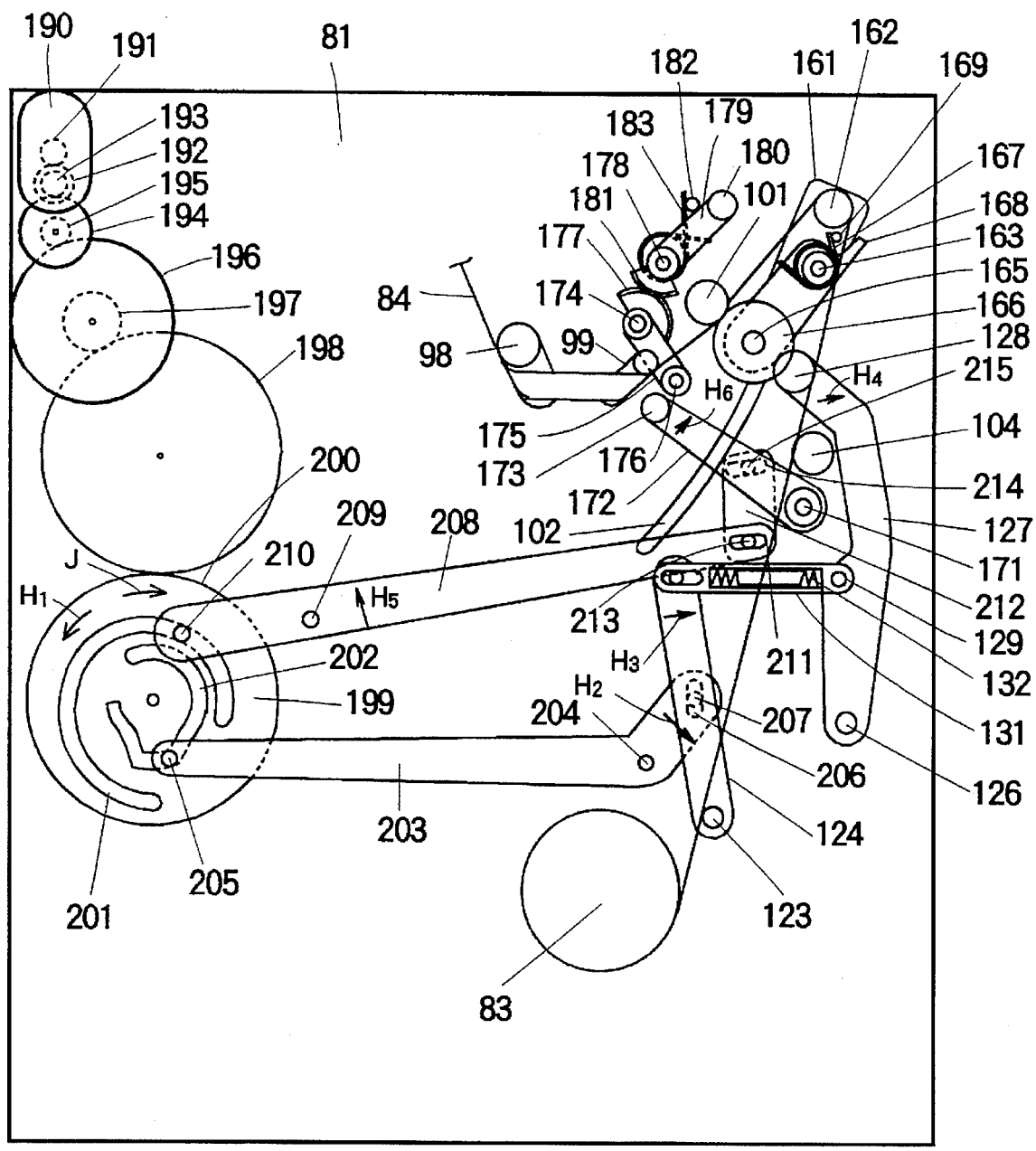
FIG. 40 is a plan view showing a drive mechanism which drives levers and other parts of the magnetic recording and reproducing device according to the ninth embodiment.

FIG. 37 is a plan view schematically showing the construction of a magnetic recording and reproducing device according to a ninth embodiment of this invention when in the unloaded state. FIG. 38 to FIG. 40 show this device when in the loaded state, FIG. 38 is a plan view showing the first tape transport mode when the magnetic tape is advanced by the capstan, FIG. 39 is a plan view showing the second tape transport mode when the magnetic tape is advanced due to the rotation of the take-up reel, and FIG. 40 is a plan view showing the construction of a drive mechanism which drives levers and other parts.

The magnetic recording and reproducing device of the ninth embodiment differs from the device of the fifth embodiment insofar as concerns the construction of the guide mechanism. In FIG. 37 to FIG. 40, using the same reference numerals to indicate parts in the construction which are identical to those of the fifth embodiment, a guide mechanism 160 of the magnetic recording and reproducing device of the ninth embodiment comprises a slider 161 which moves along the guide slot 102, a guide roller 162 implanted in the slider 161, a pinch arm 164 free to turn about a shaft 163 implanted in the slider 161, and a pinch roller 166 free to turn about a shaft 165 implanted in the pinch roller 164. This pinch roller 166 is either pressed against the capstan 101 or separated from the capstan 101 due to the rotation of the pinch arm 164 about the shaft 163. The guide mechanism 160 also comprises a torsion spring 167 wound around the shaft 163 so as to push the pinch arm 164 in a counterclockwise direction, and a stopper pin 169 which comes into contact with a stopper 168 formed at one end of the pinch arm 164.

The guide mechanism 160 further comprises a guide arm 172 free to pivot about a shaft 171 implanted in the deck base 81, a tape guide 173 provided at one end of the guide arm 172, an arm 175 free to rotate about a shaft 174 implanted in the deck base 81, a pin 176 implanted at one end of the arm 175 and disposed so that it comes into contact with the tape guide 173 due to the rotation of the guide arm 172, and a fan-shaped gear 177 fixed to the arm 175 which turns about the shaft 174.

The guide mechanism 160 still further comprises a guide arm 179 free to turn about a shaft 178 implanted in the deck base 81, a tape guide 180 provided at the end of this guide arm 179, a fan-shaped gear 181 fixed to the guide arm 179 which engages with the fan-shaped gear 177, a stopper pin 182 implanted in the deck base 81 and set so that it comes into contact with the guide arm 179, and a torsion spring 183 which pushes the guide arm 178 into contact with the stopper pin 182.

As shown in FIG. 38, when the first tape transport mode (for example, normal playback mode) is selected wherein the magnetic tape 84 is advanced due to the rotation of the capstan 101, the pinch lever 127 pivots in a counterclockwise direction, the roller 128 at the end of the pinch lever 127 comes into contact with the lateral surface of the pinch arm 164 so as to rotate the pinch arm 164 in a clockwise direction, and the pinch roller 166 is pressed against the capstan 101 so as to grip the magnetic tape 84. The guide arm 172 then pivots in a counterclockwise direction, the tape guide 173 separates from the pin 176 of the arm 175, and the guide arm 179 comes into contact with the pin 182 due to the counterclockwise restoring force of the torsion spring 183, the tape guide 180 provided at the end of the guide arm 179 then being in a position at which it is separated from the magnetic tape 84. In the first tape transport mode, the magnetic tape 84 is gripped between the capstan 101 and the pinch roller 166, and the magnetic tape 84 is advanced due to the rotation of the capstan 101 with the tape guide 180 separated from the magnetic tape 84. When there is a change-over from the first tape transport mode to the second tape transport mode (for example, the fast forward mode), as shown in FIG. 39, the pinch lever 127 rotates in a clockwise direction, the roller 128 moves away from the pinch arm 164, and the pinch arm 164 is rotated in a counterclockwise direction due to the counterclockwise restoring force of the torsion spring 167. The pinch arm 164 stops rotating when its stopper 168 comes into contact with the stopper pin 169. At the same time, the guide arm 172 pivots in a clockwise direction about the shaft 171 so that the tape guide 173 comes into contact with the pin 176 of the arm 175, the arm 175 and the fan-shaped gear 177 turn in a counterclockwise direction about the shaft 174, and the guide arm 179 which is provided with a fan-shaped gear 181 engaging with the fan-shaped gear 177 turns in a clockwise direction so that the tape guide 180 comes into contact with the magnetic tape 84. Hence, in the second tape transport mode, the tape guide 180 is brought into contact with the magnetic tape 84, and the magnetic tape 84 is advanced due to the rotation of the take-up reel 83.

According to the magnetic recording and reproducing device of the ninth embodiment as in the device of the fifth embodiment, in the second tape transport mode, for example during fast forward mode or during rewind mode, loss of tape magnetism due to the magnetic tape 84 rubbing against the capstan 101 is prevented.

Further, if the position, tilt angle and direction angle of the tape guide 180 in the second tape transport mode (in this embodiment, the case is shown when the guide is not tilted) are set so that the winding angle of the magnetic tape 84 at the slanting post 99 is the same in the first tape transport mode and the second tape transport mode, the tape travel path and position do not change due to change-over of tape transport mode, and steadiness of tape travel is consequently enhanced.

The mechanism which turns the guide arm 172 and the mechanism which rotates the drive lever 124 may for example be of the types shown in FIG. 40. FIG. 40 shows the first tape transport mode. In the figure, numeral 190 indicates a loading motor fixed to the deck base 81, numeral 191 indicates a worm engaging with a shaft of the loading motor 190, numeral 192 indicates a worm wheel engaging with the worm 191, numeral 193 indicates a gear formed coaxially in a one-piece construction with the worm wheel 192, numerals 194, 195, 196, 197 and 198 indicate gears, and numeral 199 indicates a cam gear comprising a gear 200 engaging on its outer circumference with the gear 198, and having cam grooves 201 and 202.

In FIG. 40, numeral 203 indicates a lever which pivots about a shaft 204 implanted in the deck base 81 and connects the cam gear 199 to the drive lever 124, numeral 205 indicates a pin implanted in the lever 203 and functioning as a cam follower engaging with the cam groove 202, numeral 206 indicates an oblong slot formed in the lever 203, numeral 207 indicates a pin implanted in the drive lever 124 and engaging with the slot 206.

Further, in FIG. 40, numeral 208 indicates a lever implanted in the deck base 81 and pivoting about a shaft 209, numeral 210 indicates a pin implanted in the lever 208 and engaging with the cam groove 201, numeral 211 indicates an oblong slot formed in the lever 208, numeral 212 indicates a link connecting the lever 208 to the guide arm 172, numeral 213 indicates a pin implanted in the link 212 and engaging with the slot 211, numeral 214 indicates an oblong slot formed in the link 212, numeral 215 indicates a pin implanted in the guide arm 172 and engaging with the slot 214.

When there is a change-over from the first tape transport mode shown in FIG. 40 to the second tape transport mode wherein the magnetic tape 84 is advanced due to the rotation of the take-up reel 83, the loading motor 190 is operated so as to rotate the cam gear 199 in a counterclockwise direction ($H_1$), the lever 203 pivots in a clockwise direction ($H_2$), the drive lever 124 pivots in a clockwise direction ($H_3$), the pinch arm 127 connected by the link 131 turns in a clockwise direction ($H_4$), and the pinch roller 166 separates from the capstan 101. At the same time, due to the rotation of the cam gear 199 in a counterclockwise direction ($H_1$), the lever 208 pivots in a counterclockwise direction ($H_5$) and the pinch arm 172, which is connected by means of the link 212, turns in a clockwise direction ($H_6$) so that the tape guide 180 comes into contact with the magnetic tape 84, as shown in FIG. 39.

When changing over from the second tape transport mode to the first tape transport mode, the reverse sequence of actions is performed.

When shifting from the first tape transport mode shown in FIG. 4 to the unloaded state of the device, the loading motor 190 is driven so as to rotate the cam gear 199 in a clockwise direction (direction J) so that the device reaches the state shown in FIG. 37.

The drive mechanism shown in FIG. 40 is also used as the drive mechanism in the above Embodiments 1 to 8.

What is claimed is:

1. A magnetic recording and reproducing device comprising:

a deck base extending parallel to an x-y plane defined by mutually perpendicular x and y axes; and a tape guide mechanism for guiding a magnetic tape into a tape cassette having a supply reel and a take-up reel for said magnetic tape, when the device is in an unloaded state, and out of said tape cassette and spirally winding said magnetic tape onto an outer circumference of a rotary head drum, said rotary head drum having a center axis aligned at a predetermined tilt angle with respect to a z axis perpendicular to the x-y plane and a predetermined direction angle with respect to the x axis, said tape guide mechanism comprising:

a first guide roller provided on a first moving member movable along a guide slot on the supply reel side of said rotary head drum, said first guide roller rotating about a first axis parallel with the z axis and winds said magnetic tape such that a center line of said magnetic tape lies in a reference plane parallel to the x-y plane, when the device is in the loaded state;

a second guide roller provided on a second moving member movable along a second guide slot which comprises a slanting part which slants downwards from said x-y plane as said second guide slot approaches said rotary head drum, said second guide roller rotating about a second axis having predetermined tilt and direction angles with respect to the z and x axes respectively, when the device is in the loaded state, said second guide roller winding said tape off of said rotary head drum; and a first slanting post fixed to said deck base at predetermined tilt and direction angles with respect to the z and x axes respectively, such that when the device is in the loaded state, said first slanting post coacts with said second guide roller so as to redirect the center line of said magnetic tape to said reference plane;

wherein neither of said first and second moving members is provided with a slanting post.

2. A magnetic recording and reproducing device as defined in claim 1, further comprising:

a second slanting post fixed to said deck base between said second guide roller and said first slanting post at a predetermined tilt angle with respect to the z axis and a predetermined direction angle with respect to the x axis, the magnetic tape from said second guide roller being wound on said second slanting post when the device is in the loaded state so that the travel direction of said magnetic tape is changed.

3. The magnetic recording and reproducing device according to claim 2, wherein said second guide roller has a tilt angle of 20.0° and a direction angle of 112.5°, said first slanting post has a tilt angle of 33.0° and a direction angle of 114.8° and said second slanting post has a tilt angle of 23.5° and a direction angle of 33.9°.

4. A magnetic recording and reproducing device as defined in claim 1, further comprising:

a third guide roller provided between said second guide roller and said first slanting post, said third guide roller rotating about a third axis aligned at a predetermined tilt angle with respect to the z axis and a predetermined direction angle with respect to the x axis, and the magnetic tape from said second guide roller being wound on said third guide roller when said device is in the loaded state so that the travel direction of said magnetic tape is changed.

5. A magnetic recording and reproducing device as defined in claim 1, wherein said third axis of said third guide roller is parallel to said second axis of said second guide roller.

6. A magnetic recording and reproducing device as defined in claim 4 further comprising:

a capstan situated between said second guide roller and said first slanting post, said capstan being aligned at a predetermined tilt angle with respect to the z axis and at a predetermined direction angle with respect to the x axis; and a pinch roller for pushing said magnetic tape against said capstan.

7. A magnetic recording and reproducing device as defined in claim 6, wherein said tilt angle of said capstan with respect to the z axis and said direction angle of said capstan with respect to the x axis, are the same as the corresponding tilt angle and direction angle of said second guide roller and said third guide roller.

8. The magnetic recording and reproducing device according to claim 4, wherein said second guide roller has a tilt angle of 20.0° and a direction angle of 112.5°, said third guide roller has a tilt angle of 20.0° and a direction angle of 112.5°, and said first slanting post has a tilt angle of 25.8° and a direction angle of 44.0°.

9. A magnetic recording and reproducing device as defined in claims 1 further comprising:

a capstan situated between said second guide roller and said first slanting post, said capstan being aligned at a predetermined tilt angle with respect to the z axis and at a predetermined direction angle with respect to the x axis; and a pinch roller for pushing said magnetic tape against said capstan.

10. A magnetic recording and reproducing device as defined in claim 9, wherein said tilt angle of said capstan with respect to the z axis and said direction angle of said capstan with respect to the x axis, are the same as the corresponding tilt angle and direction angle of said second guide roller.

11. The magnetic recording and reproducing device according to claim 1, wherein said slanting post has a tilt angle of 11.8° and a direction angle of 80.0°, and said second guide roller has a tilt angle of 20.0° and a direction angle of 112.5°.

12. A magnetic recording and reproducing device comprising:

a deck base extending parallel to an x-y plane defined by mutually perpendicular x and y axes; and a tape guide mechanism for guiding a magnetic tape into a tape cassette having a supply reel and a take-up reel for said magnetic tape, when the device is in an unloaded state, and out of said tape cassette and spirally winding said magnetic tape onto an outer circumference of a rotary head drum, said rotary head drum having a center axis aligned at a predetermined tilt angle with respect to a z axis perpendicular to the x-y plane and a predetermined direction angle with respect to the x axis, said tape guide mechanism comprising:

a first guide member provided on a first moving member movable along a guide slot on the supply reel side of said rotary head drum, said first guide member having a first axis parallel with the z axis and which directs said magnetic tape such that a center line of said magnetic tape lies in a reference plane parallel to the x-y plane, when the device is in the loaded state;

a second guide member provided on a second moving member movable along a second guide slot which comprises a slanting part which slants downwards from said x-y plane as said second guide slot approaches said rotary head drum, said second guide member having a second axis with predetermined tilt and direction angles with respect to the z and x axes respectively, when the device is in the loaded state, said second guide member directing said tape off of said rotary head drum; and a first slanting guide member fixed to said deck base at predetermined tilt and direction angles with respect to the z and x axes respectively, such that when the device is in the loaded state, said first slanting guide member coacts with said second guide member so as to redirect the center line of said magnetic tape to said reference plane;

wherein neither of said first and second moving members is provided with a slanting guide post.

* * * * *